(12) United States Patent
Lai et al.

(10) Patent No.: US 11,175,439 B2
(45) Date of Patent: Nov. 16, 2021

(54) TRANSMISSION STRUCTURE

(71) Applicant: Nanjing Star Hidden Technology Development Co., Ltd., Jiangsu (CN)

(72) Inventors: Yun Lai, Nanjing (CN); Hongchen Chu, Nanjing (CN)

(73) Assignee: NANJING STAR HIDDEN TECHNOLOGY DEVELOPMENT CO., LTD., Jiangsu (CN)

( * ) Notice: Subject to any disclaimer, the term of this patent is extended or adjusted under 35 U.S.C. 154(b) by 0 days.

(21) Appl. No.: 16/976,424

(22) PCT Filed: Oct. 21, 2019

(86) PCT No.: PCT/CN2019/112097
§ 371 (c)(1),
(2) Date: Aug. 27, 2020

(87) PCT Pub. No.: WO2021/077243
PCT Pub. Date: Apr. 29, 2021

(65) Prior Publication Data
US 2021/0116613 A1   Apr. 22, 2021

(51) Int. Cl.
*G02B 5/02* (2006.01)

(52) U.S. Cl.
CPC ................. *G02B 5/0221* (2013.01)

(58) Field of Classification Search
CPC .... G02B 5/085; G02B 5/0221; G02B 5/0226; G02B 5/0231; G02B 5/0284; G02B 5/0278; G02B 5/0294; G02B 5/0825; G02B 5/22; G02B 5/285; G02B 5/286; G02B 5/1814; G02B 5/1861; G02B 5/1866;
(Continued)

(56) References Cited

U.S. PATENT DOCUMENTS 8,872,713 B1   10/2014   Buckley et al.
2006/0061715 A1   3/2006   Tashiro et al.
(Continued)

FOREIGN PATENT DOCUMENTS

CN   102221722   10/2011
CN   202189205   4/2012
(Continued)

OTHER PUBLICATIONS

Written Opinion issued for International Patent Application No. PCT/CN2019/112097, dated Mar. 6, 2020, 8 pages including English translation.
(Continued)

*Primary Examiner* — Mustak Choudhury
(74) *Attorney, Agent, or Firm* — Hamre, Schumann, Mueller & Larson, P.C.

(57) ABSTRACT

A transmission structure includes a plurality of first transmission units and a plurality of second transmission units. A transmission phase of an electromagnetic wave of the second transmission unit is equal or similar to a transmission phase of an electromagnetic wave of the first transmission unit. A reflection phase of the electromagnetic wave of the second transmission unit is different from a reflection phase of the electromagnetic wave of the first transmission unit. The plurality of first transmission units and the plurality of second transmission units are arranged disorderly on a surface.

21 Claims, 21 Drawing Sheets

(58) Field of Classification Search
CPC .. G02B 5/1871; G02B 5/3083; G02B 27/145;
G02B 27/148; G02B 6/008; G02B 6/352;
G02B 6/2817; G02B 6/3514; G02B
6/3516; G02B 6/3518; G02B 6/3522;
G02B 6/3532; G02B 26/001; G02B
26/06; G02B 2005/1804; G02F 1/133753;
G02F 1/133555; G02F 1/1393; G02F
1/133761; G02F 1/133788; H01Q 3/02
See application file for complete search history.

(56) References Cited

U.S. PATENT DOCUMENTS

| | | | |
|---|---|---|---|
| 2006/0279843 A1* | 12/2006 | Kurt | G02B 5/1847 |
| | | | 359/558 |
| 2013/0099973 A1 | 4/2013 | Kwak | |
| 2013/0265668 A1 | 10/2013 | Banerjee et al. | |
| 2016/0306167 A1* | 10/2016 | Mossberg | G02B 5/1866 |
| 2019/0033683 A1 | 1/2019 | Ahmed et al. | |

FOREIGN PATENT DOCUMENTS

| | | |
|---|---|---|
| CN | 104011582 | 8/2014 |
| CN | 104249597 | 12/2014 |
| CN | 107093800 | 8/2017 |
| CN | 107359422 | 11/2017 |
| CN | 107683426 | 2/2018 |
| CN | 108711681 | 10/2018 |
| CN | 109698407 | 4/2019 |
| CN | 110165414 | 8/2019 |
| WO | 2019116664 | 6/2019 |
| WO | 2019178553 | 9/2019 |

OTHER PUBLICATIONS

Li, M. "Control of Polarization and Transmission of Electromagnetic Wave Based on Metasurface," Dissertation for the Master's Degree of Engineering, 2016, 60 pages including English abstract on pp. II & III.

Chu, H. et al., "A Meta-coupler for Converting Propagating Waves to Guided Waves in Wire Waveguides," IEEE Photonics Journal, DOI 10.1109/JPHOT.2017.2725299, 2017, 6 pages.

* cited by examiner

TRANSMISSION STRUCTURE

TECHNICAL FIELD

The present disclosure relates to the field of electromagnetic wave imaging technology, and more particularly relates to a transmission structure.

BACKGROUND

Traditional light-transmitting materials, such as glass, have smooth and flat surfaces. Upon incidence of light, both the transmitted light and reflected light can form images. However, when there are inappropriate brightness distributions in the surrounding environment, these brightness distributions will be reflected by the light-transmitting materials, which causes people's visual fatigue or discomfort.

In the conventional technology, people solve the above problem by forming rough and matt structures (such as frosted glass) on the surfaces of such light-transmitting materials to cause diffuse reflection. However, when light is irradiated on such processed light-transmitting materials, neither transmitted light nor reflected light can form images. Therefore, people cannot obtain information through such light-transmitting materials, which is likely to cause much inconvenience in our daily lives.

SUMMARY

According to various embodiments of the present disclosure, a transmission structure is provided.

A transmission structure includes:

a plurality of first transmission units; and, a plurality of second transmission units, a transmission phase of an electromagnetic wave of the second transmission unit is equal or similar to a transmission phase of an electromagnetic wave of the first transmission unit, a reflection phase of an electromagnetic wave of the second transmission unit is different from a reflection phase of an electromagnetic wave of the first transmission unit;

the plurality of first transmission units and the plurality of second transmission units are arranged disorderly on a surface.

According to another aspect of the present disclosure, a film including the transmission structure of the above embodiment is provided.

According to yet another aspect of the present disclosure, an electronic apparatus including a display device and the film of the above embodiment disposed on a surface of the display device is provided.

According to yet another aspect of the present disclosure, a resin sheet including the transmission structure of the above embodiment is provided.

According to yet another aspect of the present disclosure, a glass including the transmission structure of the above embodiment is provided.

The details of one or more embodiments of the disclosure are set forth in the accompanying drawings and description below. Other features, objects and advantages of the present disclosure will become apparent from the description, the accompanying drawings, and the claims.

BRIEF DESCRIPTION OF THE DRAWINGS

To better describe and illustrate embodiments or examples of the disclosure disclosed herein, reference may be made to one or more accompanying drawings. The additional details or examples used to describe the accompanying drawings should not be construed as limiting the scope of any of the disclosed disclosure, the presently described embodiments or examples, and the presently understood preferred modulus of the disclosure.

DETAILED DESCRIPTION

To make the objects, technical solutions and advantages of the present disclosure to be more apparent and understandable, reference will be made to the accompanying drawings and embodiments to describe the present disclosure in detail below. It should be understood that the specific embodiments described herein are only used to explain the present disclosure and not intended to limit the present disclosure.

It should be understood that when an element is defined as "disposed" on another element, it is either directly on an element or indirectly on an element with a mediating element. When an element is considered to be "connected" to another element, it can be directly connected to another element or indirectly connected to another element with a mediating element. The terms "vertical", "horizontal", "left", "right", and the like used herein are for illustrative purposes only and are not intended to be the only example.

All technical and scientific terms used herein have the same meaning as commonly understood by one of ordinary skill in the art to which this disclosure applies, unless otherwise defined. The terms used in the specification of present disclosure herein are for the purpose of describing specific embodiments only and are not intended to limit the present disclosure. The technical features of the above-described exemplary embodiments can be combined arbitrarily. To simplify the description, not all possible combinations of the technical features in the above embodiments are described. However, all of the combinations of these technical features should be considered as within the scope of this disclosure, as long as such combinations do not contradict with each other.

Figure 1:
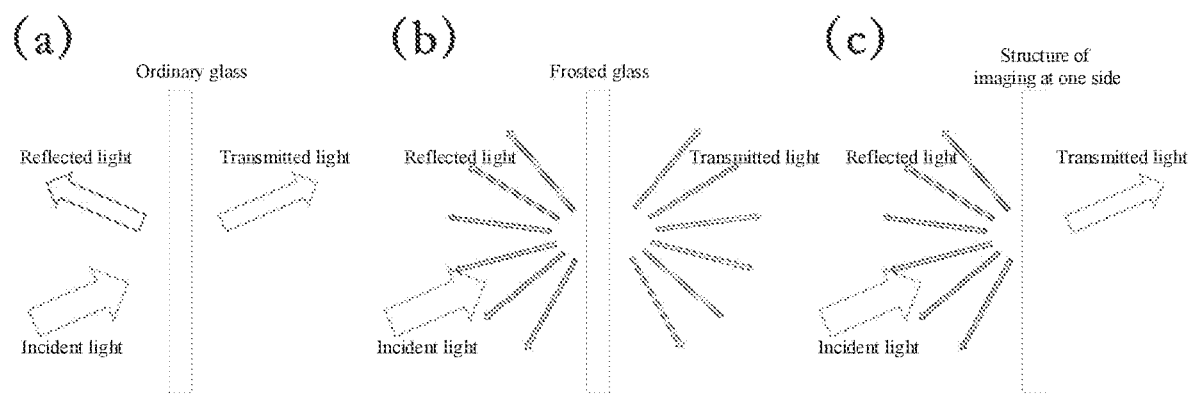
FIGS. 1(a)-(c) are schematic diagrams of transmission and reflection of an ordinary glass, a frosted glass, and a transmission structure, respectively.

The surfaces of ordinary glass are smooth and flat, and both transmitted light and reflected light of the ordinary glass can form images, as shown in FIG. 1(a). However, when there is a strong light source in the surrounding environment, glare will form on this glass, which is easy to cause damage to human eyes. Therefore, people use emery or chemical methods to process the surfaces of the glass, so as to make the surfaces thereof rough and uneven to form frosted glass, thereby preventing the glare. However, the conventional frosted glass will make neither the transmitted light nor the reflected light can form images, as shown in FIG. 1(b). Therefore, if the conventional frosted glass is used as window glass of buildings or windshields of cars, it cannot meet needs of people's daily lives.

The defects of the above solutions are results obtained by the inventors through practice and careful research. Therefore, the discovery process of the above problems and the solutions proposed in the embodiments of the present disclosure for the above problems below shall be regarded as the inventors' contributions to the present disclosure during the process of the present disclosure.

Please refer to FIG. 1(c), the present disclosure is to design the structure of the transmission units such that the transmitted electromagnetic waves can form images and the reflected electromagnetic waves cannot form images (that is, diffuse reflection is formed). There are many kinds of transmission units common in nature, such as glass, quartz, calcium fluoride, and the like.

As shown in FIG. 2(a), FIG. 3(a), FIG. 4(a), and FIG. 5(a), a transmission structure including a plurality of first transmission units I (parts of unshaded squares in the figures) and a plurality of second transmission units II (parts of shaded squares in the figures) is provided in the embodiments of the present disclosure.

Specifically, a transmission phase of an electromagnetic wave of the second transmission unit II is equal or similar to a transmission phase of an electromagnetic wave of the first transmission unit I. A reflection phase of an electromagnetic wave of the second transmission unit II is different from a reflection phase of an electromagnetic wave of the first transmission unit I.

Transmission imaging requires a wavefront of the transmitted electromagnetic wave identical to a wavefront of the incident electromagnetic wave. In the present disclosure, the transmission phase of the first transmission unit I and the transmission phase of the second transmission unit II are the same or similar, and the transmitted wave can maintain the wavefront information of the incident electromagnetic wave, so that the electromagnetic wave can transmit through this transmission structure and form images on the transmission side of this transmission structure. Further, a transmittance of the first transmission unit I may be equal or similar to a transmittance of the second transmission unit II, so as to further improve the imaging quality of the transmitted wave.

The plurality of first transmission units I and the plurality of second transmission units II are arranged disorderly on a surface. Specifically, a size of the first transmission unit I and a size of the second transmission unit II may be similar to a wavelength of the incident electromagnetic wave, that is, the size may be set in a magnitude of wavelength or sub-wavelength. Of course, when the sizes of the first transmission unit I and the second transmission unit II are set in a magnitude of sub-wavelength, the single-sided imaging performance of the transmission structure will have a better effect.

Since the reflection phase of the second transmission unit II and the reflection phase of the first transmission unit I are different, after they are disorderly arranged on a surface to form a transmission structure, the reflected electromagnetic waves formed on the incident surface of the transmission structure after the electromagnetic waves incident on the transmission structure will interfere with each other, that is, constructive interference or destructive interference occurs, so that the energy distribution of the reflected electromagnetic waves is uneven, forming diffuse reflection. In this case, the wavefronts of the reflected electromagnetic waves are changed, and the same wavefronts as the wavefronts of the incident electromagnetic waves cannot be maintained, therefore, the electromagnetic waves reflected by this transmission structure cannot form images on the reflection side of this transmission structure.

The followings are four embodiments of the disordered arrangement of the transmission structure provided by the present disclosure.

Figure 2A:
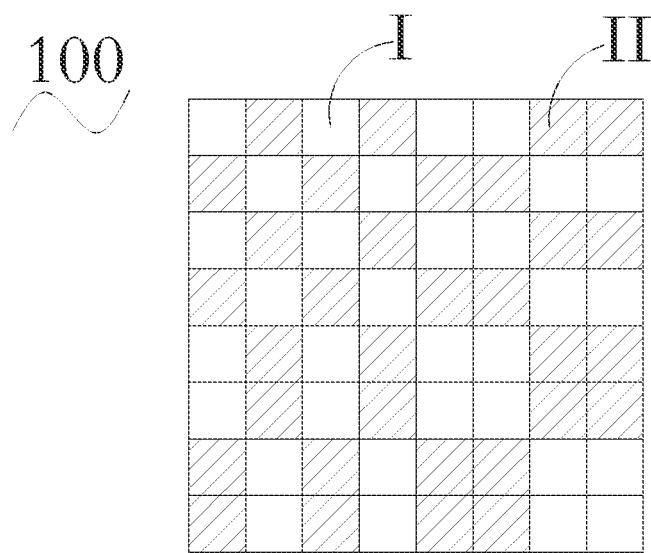
FIGS. 2(a)-(c) are a disordered arrangement schematic diagram of a first transmission unit I and a second transmission unit II, a far-field radiation power pattern on a reflection side, and a far-field radiation power pattern on a transmission side of a transmission structure according to an embodiment of the present disclosure, respectively.
Figure 2B:
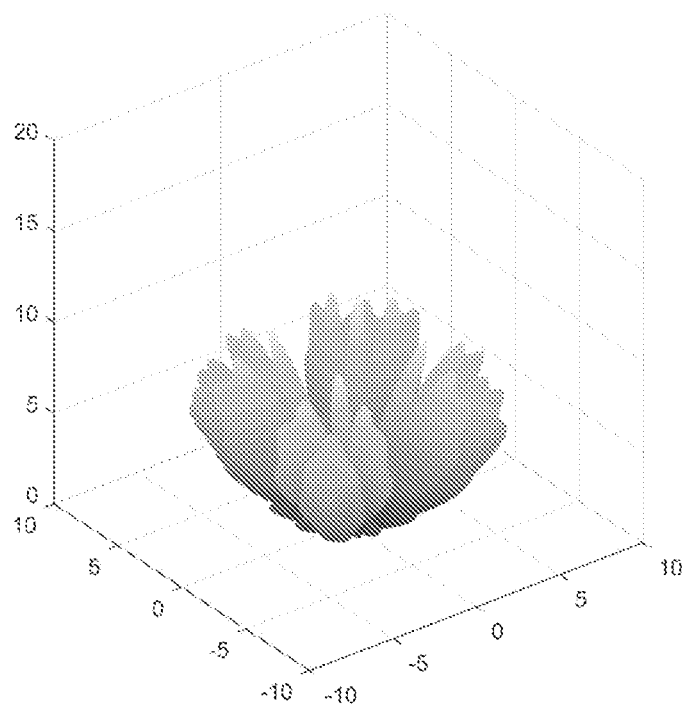
Figure 2C:
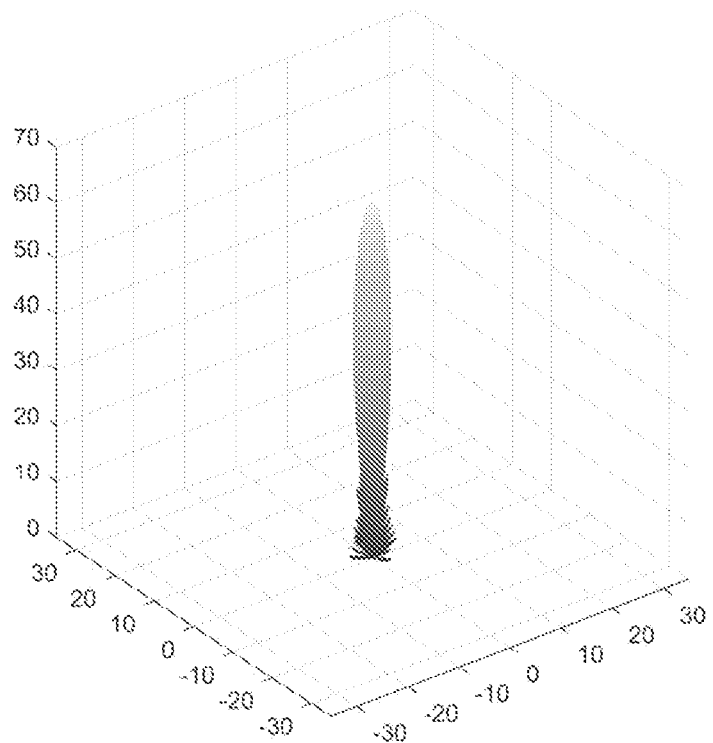

Taking the transmission structure 100 shown in FIG. 2(a) as an example, the transmission structure 100 has 8×8 square structures, and each of the square structures has a side length of $0.87\lambda_0$, $\lambda_0$ is the wavelength of the incident electromagnetic wave in vacuum. The transmission phase of the electromagnetic wave of the second transmission unit II and the transmission phase of the electromagnetic wave of the first transmission unit I are the same (that is, a transmission phase difference therebetween is 0), and a reflection phase difference therebetween is π The scene of the electromagnetic wave being incident to the transmission structure 100 is simulated using a simulation software, so as to obtain the far-field radiation power pattern on the reflection side of FIG. 2(b) and the far-field radiation power pattern on the transmission side of FIG. 2(c) of the transmission structure 100. The incident angle of the electromagnetic wave is 0° (that is, normal incidence), the three-dimensional coordinates in FIG. 2(b) and FIG. 2(c) each represent the spatial position coordinates of the reflection side and the transmission side of the transmission structure 100. As shown in FIG. 2(b), the energy of the reflected electromagnetic wave is scattered toward many directions, the wavefront is changed due to the constructive or destructive interference of the reflected wave, and the wavefront of the incident electromagnetic wave cannot be maintained, so the reflected electromagnetic wave cannot form images on the reflection side of the transmission structure 100. As shown in FIG. 2(c), the energy of the transmitted electromagnetic wave is concentrated in the normal incidence direction, it can be seen that the wavefronts of the electromagnetic waves transmitted through the first transmission unit I and the second transmission unit II remain the same as the wavefronts of the incident electromagnetic waves, that is, the transmission phase of the electromagnetic wave of the first transmission unit I and the transmission phase of the electromagnetic wave of the second transmission unit II are the same, so that the transmitted electromagnetic waves can form images on the transmission side of the transmission structure 100.

Figure 3A:
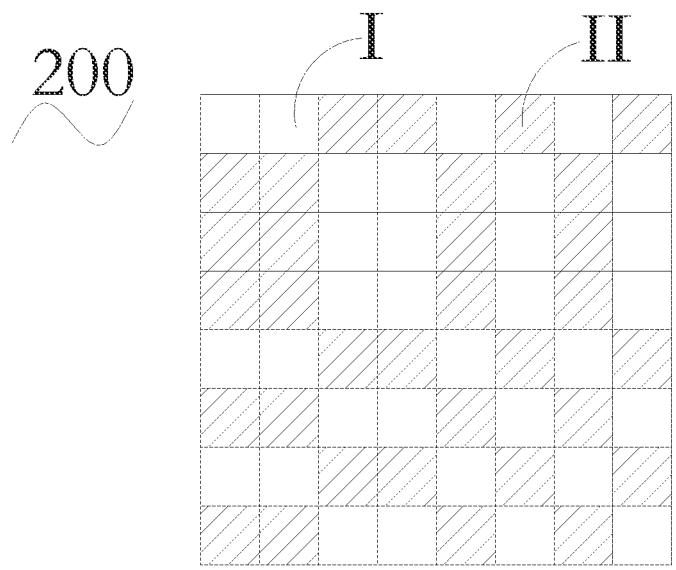
FIGS. 3(a)-(c) are a disordered arrangement schematic diagram of a first transmission unit I and a second transmission unit II, a far-field radiation power pattern on a reflection side, and a far-field radiation power pattern on a transmission side of a transmission structure according to another embodiment of the present disclosure, respectively.
Figure 3B:
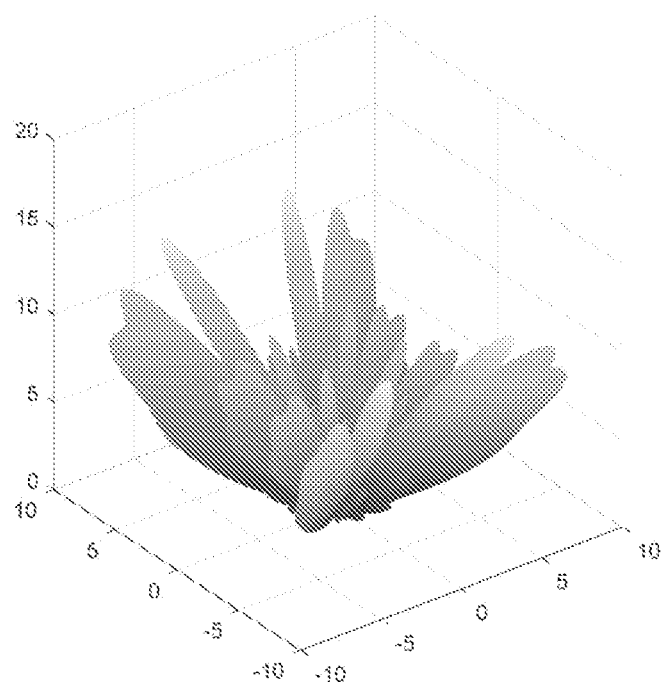
Figure 3C:
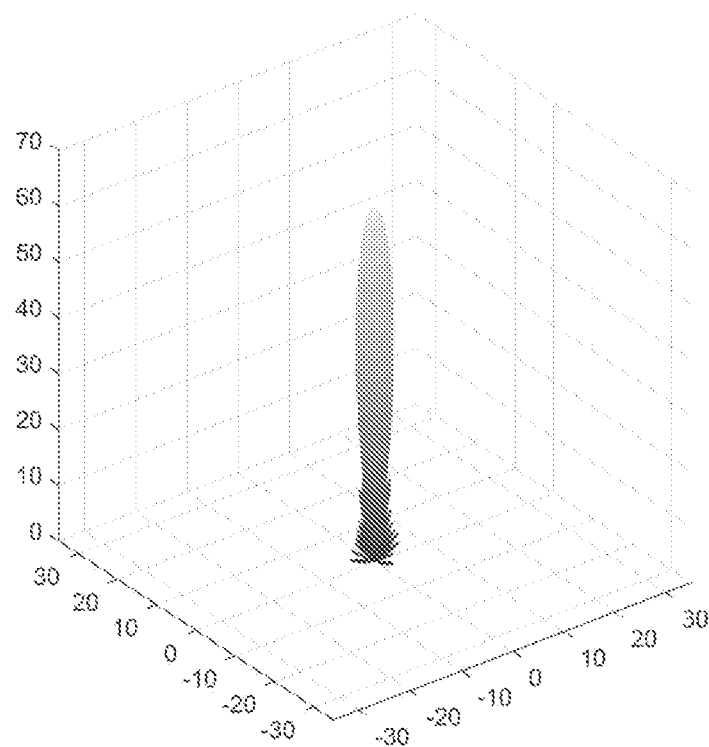
Figure 4A:
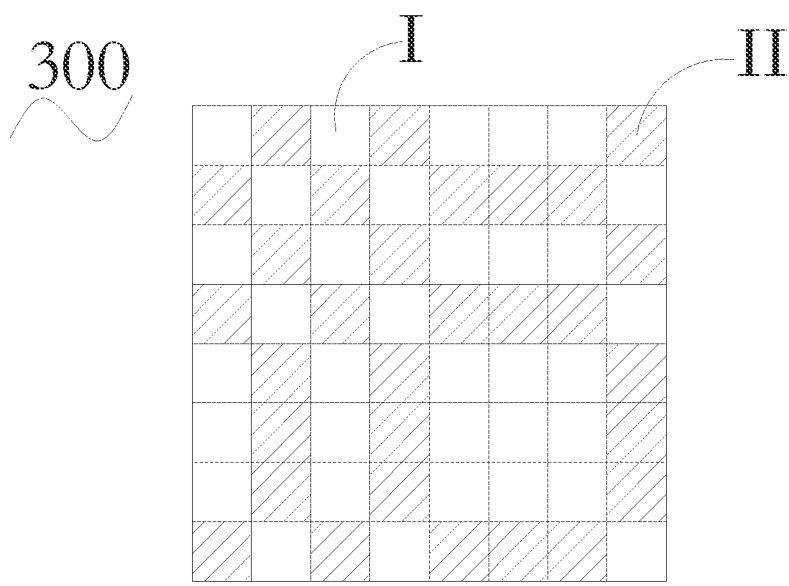
FIGS. 4(a)-(c) are a disordered arrangement schematic diagram of a first transmission unit I and a second transmission unit II, a far-field radiation power pattern on a reflection side, and a far-field radiation power pattern on a transmission side of a transmission structure according to another embodiment of the present disclosure, respectively.
Figure 4B:
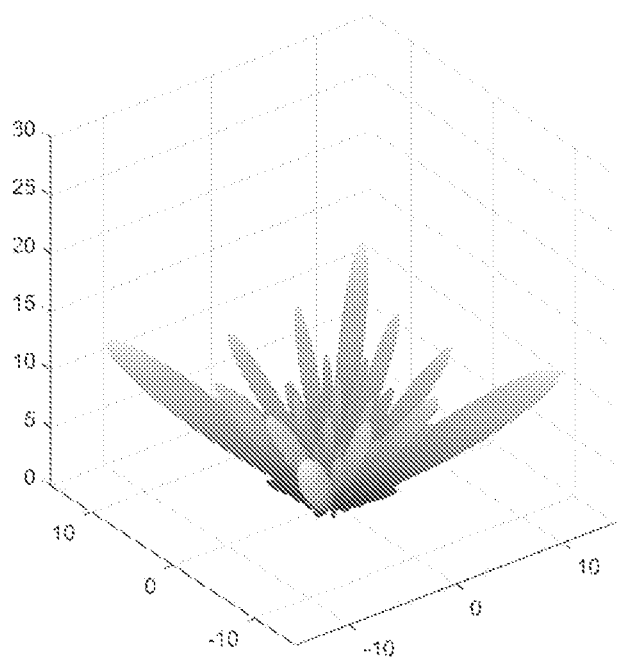
Figure 4C:
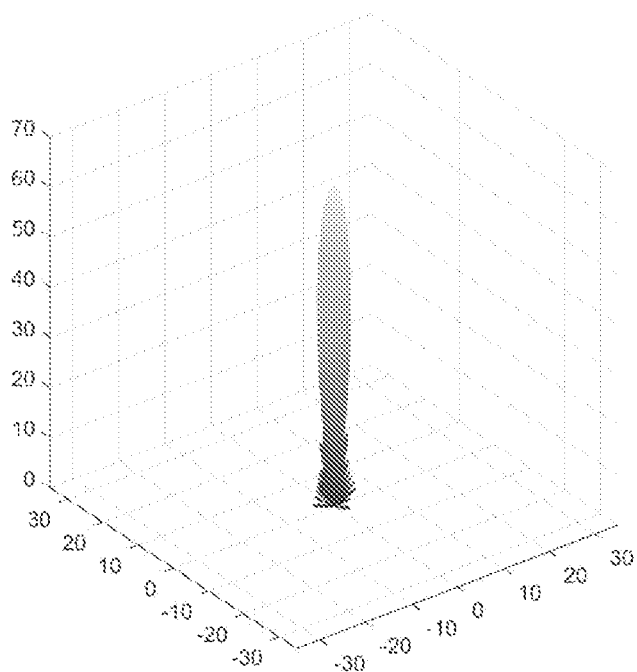
Figure 5A:
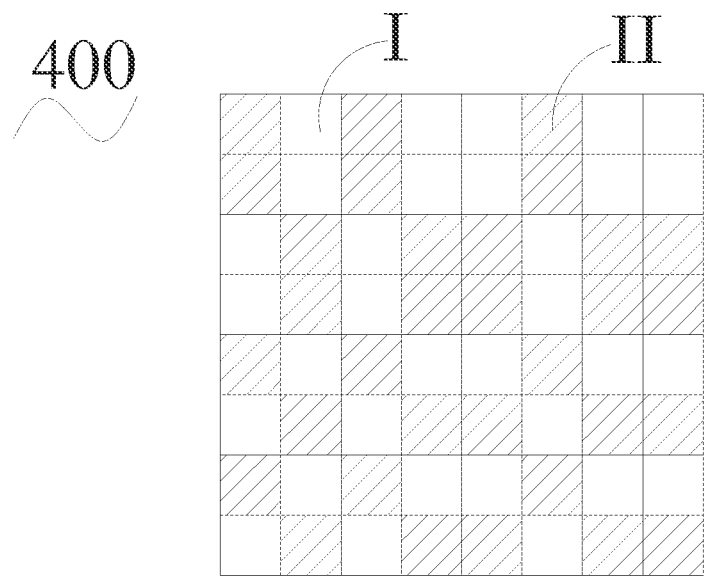
FIGS. 5(a)-(c) are a disordered arrangement schematic diagram of a first transmission unit I and a second transmission unit II, a far-field radiation power pattern on a reflection side, and a far-field radiation power pattern on a transmission side of a transmission structure according to an embodiment of the present disclosure, respectively.
Figure 5B:
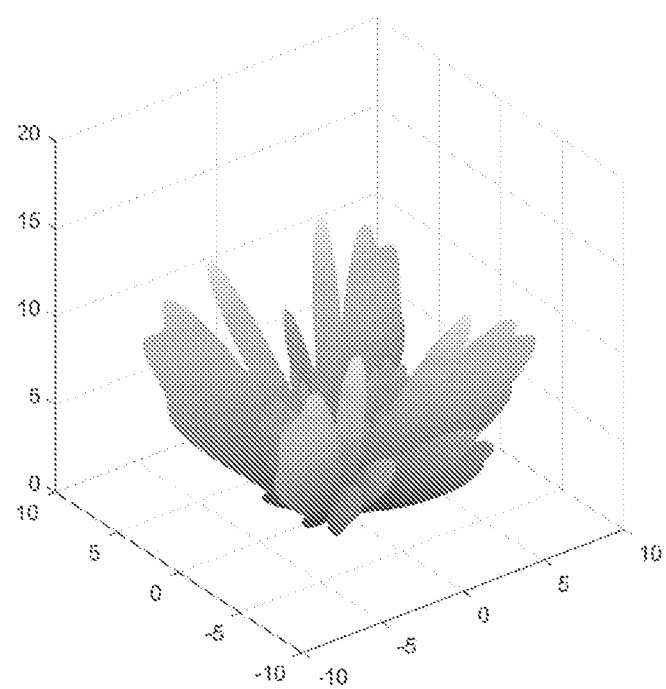
Figure 5C:
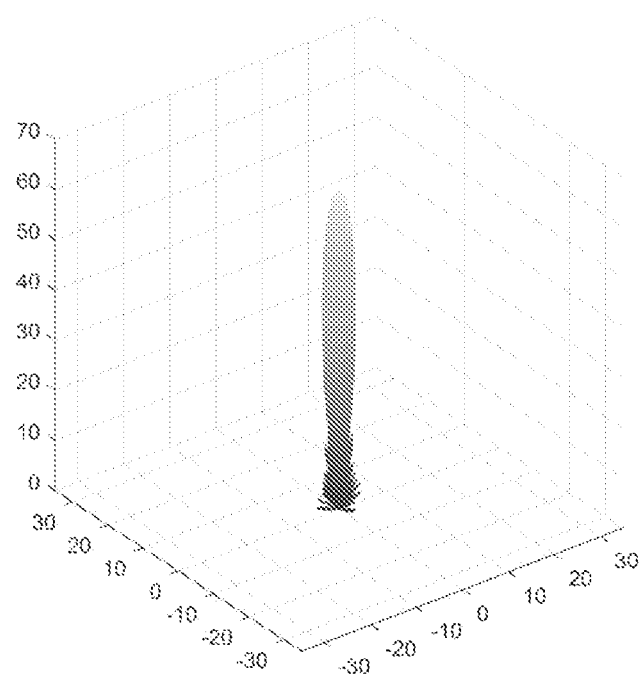

FIG. 3(a), FIG. 4(a) and FIG. 5(a) respectively show three other transmission structure 200, transmission structure 300 and transmission structure 400 (each of which have 8×8 square structures, and each of the square structures has a side length of $0.87\lambda_0$) each having a disordered arrangement structure. The second transmission unit II and the first transmission unit I are also set to have the same transmission phase (that is, the transmission phase difference therebetween is 0), and the reflection phase difference therebetween is π. It can also be seen through the simulation that, in the far-field radiation power patterns on the reflection side of FIG. 3(b), FIG. 4(b), and FIG. 5(b) corresponding to the respective embodiments, the energy of the reflected electromagnetic wave is dispersed toward the surroundings and cannot form images on the reflection sides of the transmission structure 200, the transmission structure 300, and the transmission structure 400. In the far-field radiation power patterns on the reflection side of FIG. 3(c), FIG. 4(c), and FIG. 5(c) corresponding to the respective embodiments, the energy of the transmitted electromagnetic wave is concentrated in the normal incidence direction and has a high transmittance, the wavefront of the transmitted electromagnetic wave remain the same as the wavefront of the incident electromagnetic wave, so that the transmitted electromagnetic wave can form images on the transmission sides of the transmission structure 200, the transmission structure 300, and the transmission structure 400.

Figure 6A:
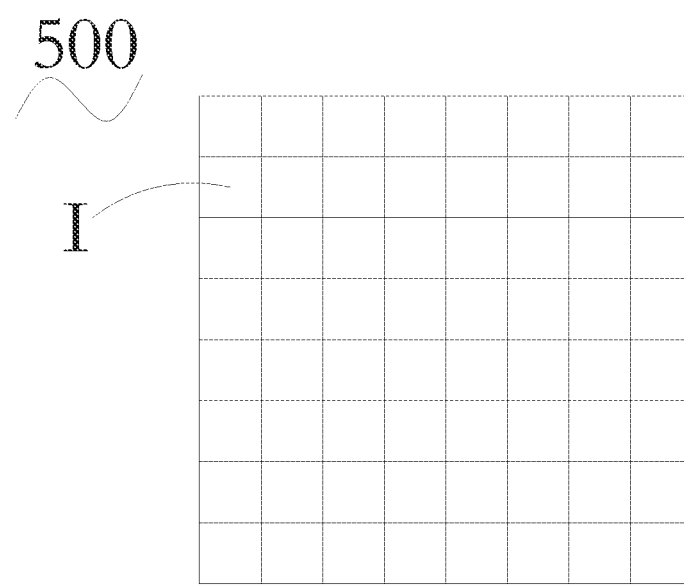
FIGS. 6(a)-(c) are a schematic diagram, a far-field radiation power pattern on a reflection side, and a far-field radiation power pattern on a transmission side of a uniform transmission structure formed of only first transmission units I, respectively.
Figure 6B:
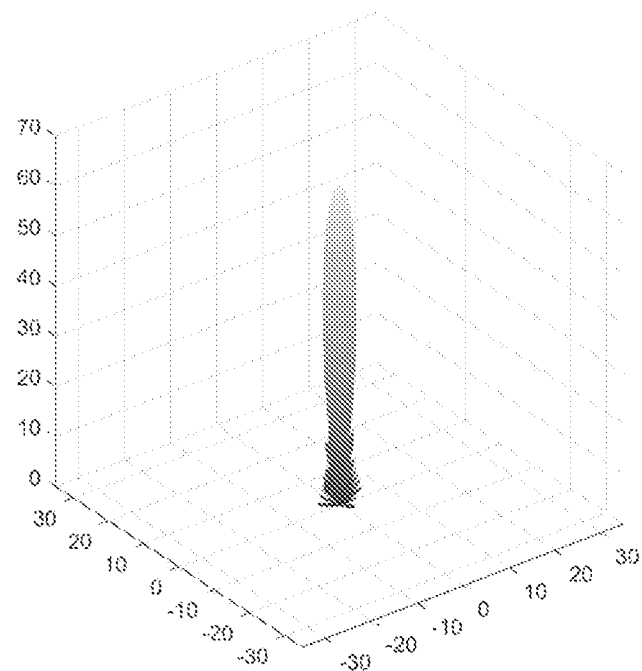
Figure 6C:
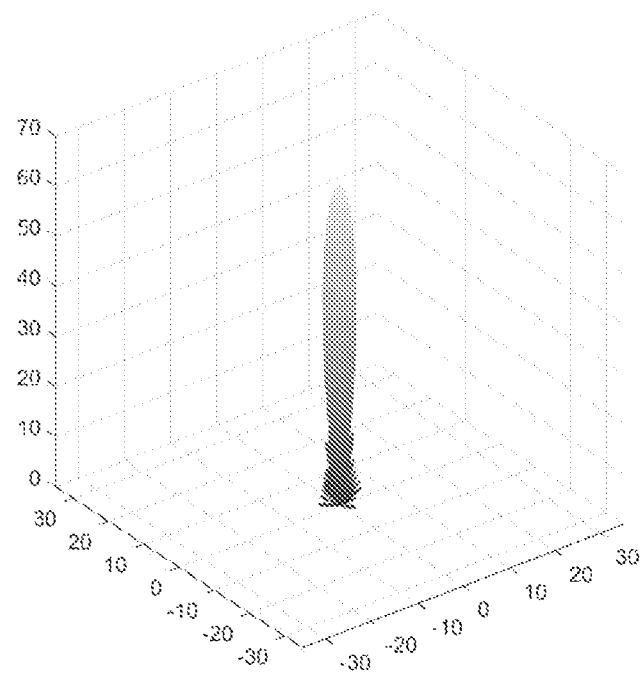

For comparison, the present disclosure also shows a uniform transmission structure 500 having the same size and arranged only with the first transmission units I in FIGS. 6(a) to 6(c). It can be seen that, the energy of the reflected electromagnetic wave in FIG. 6(b) is concentrated in a direction opposite to the normal incidence direction, the reflected electromagnetic waves have the same phase, and no constructive interference or destructive interference will occur, so that the reflected electromagnetic wave can form images on the reflective side. The energy of the transmitted electromagnetic wave in FIG. 6(c) is concentrated in the normal incidence direction, and the wavefront of the transmitted electromagnetic wave remain the same as the wavefront of the incident electromagnetic wave, so that the transmitted electromagnetic wave can also form images on the transmission side. Specifically, in combination with FIG. 2(b), FIG. 3(b), FIG. 4(b), and FIG. 5(b), it can be seen that the limit values of the electromagnetic waves on the reflection side of the embodiments corresponding to the above FIGS. 2-5 are respectively reduced to 17.2%, 25.16%, 33.19% and 22.67% of those of the uniform structure. Further, in combination with FIG. 2(c), FIG. 3(c), FIG. 4(c), and FIG. 5(c), it can be seen that in the embodiments corresponding to FIGS. 2-5, under the condition that the electromagnetic wave can maintain a high transmittance, the electromagnetic wave can form a diffuse reflection on the reflection side, thereby achieving a better effect of single-sided imaging.

It should be noted that, in other embodiments, the disposed positions of the above first transmission units I and the disposed positions of the above second transmission units II may also be interchanged. The arrangements in the drawings are merely shown as examples in the present disclosure. In addition, the plurality of first transmission units I and the plurality of second transmission units II may be arranged on a surface, or may be arranged in a curved surface or a folded surface. The shape of the arrangement surface of the plurality of first transmission units I and the plurality of second transmission units II is not limited in the embodiments of the present disclosure.

In some embodiments, the transmission phase $\varphi_{t2}$ of the electromagnetic wave of the second transmission unit II and the transmission phase $\varphi_{t1}$ of the electromagnetic wave of the first transmission unit I satisfy $0 \le |\varphi_{t2}-\varphi_{t1}| \le 0.5\pi$. By controlling the transmission phase of the electromagnetic wave of the second transmission unit II and the transmission phase of the electromagnetic wave of the first transmission unit I to satisfy the above relationship, the transmitted electromagnetic wave can form images on the transmission side of the transmission structure, and the resulting image can have a certain clarity degree. Specifically, the transmission phase difference between the two transmission units may be 0, 0.1π, 0.2π, 0.3π, 0.4π, or 0.5π.

Figure 7A:
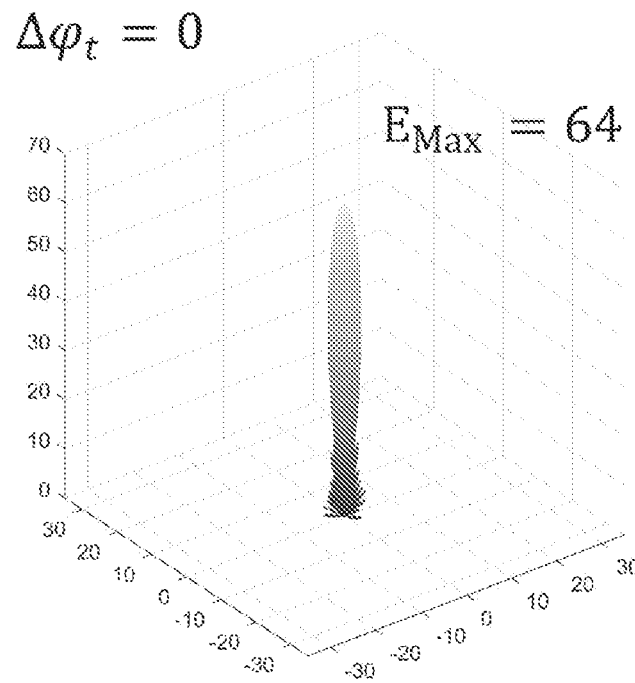
FIGS. 7(a)-(c) are far-field radiation power patterns on a transmission side when the first transmission unit I and the second transmission unit II of the embodiment shown in FIG. 2(a) take different transmission phase differences, respectively.
Figure 7B:
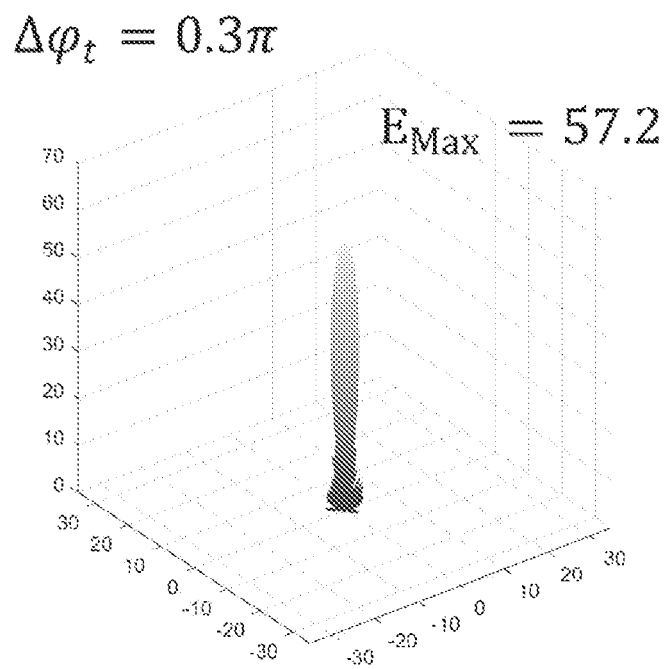
Figure 7C:
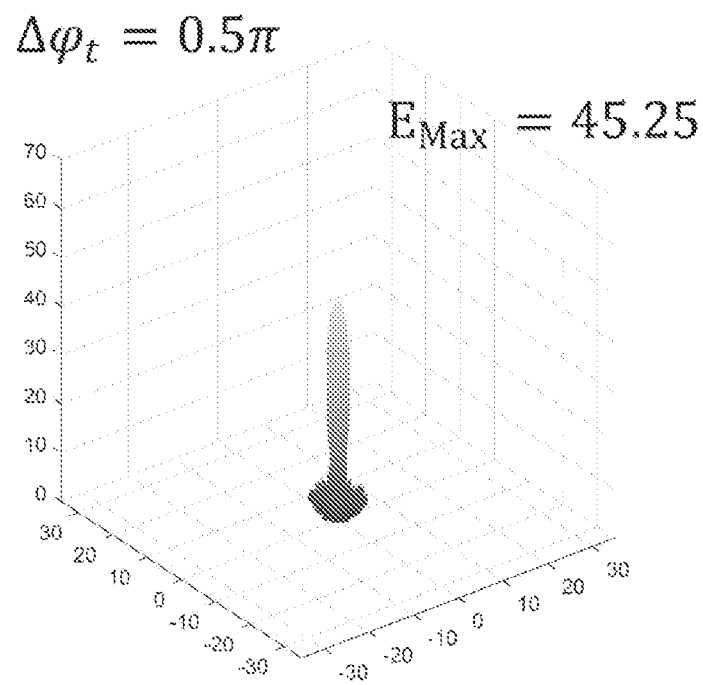

Specifically, taking the transmission structure 100 shown in FIG. 2(a) as an example, the transmission phase difference between the first transmission unit I and the second transmission unit II is adjusted separately. FIGS. 7(a) to 7(c) respectively show far-field radiation power patterns on the transmission side when the difference $\Delta\varphi_t$ between the transmission phase $\varphi_{t2}$ of the electromagnetic wave of the second transmission unit II and the transmission phase $\varphi_{t1}$ of the electromagnetic wave of the first transmission units I is 0, 0.3π, and 0.5π, respectively, the electromagnetic waves are vertically incident to the transmission structure 100. It can be seen that the energy of the transmitted electromagnetic waves in the above cases is concentrated in the normal incidence direction. Even when the transmission phase difference is 0.5π, the maximum value of the far-field electric field on the transmission side remains at 70% or more of that when the phase difference is 0, which indicates that the transmitted electromagnetic waves in this case can still form clear images.

In some embodiments, the reflection phase $\varphi_{r2}$ of the electromagnetic wave of the second transmission unit II and the reflection phase $\varphi_{r1}$ of the electromagnetic wave of the first transmission unit I satisfy $0.6\pi \leq |\varphi_{r2}-\varphi_{r1}| \leq 1.4\pi$. By controlling the reflection phase of the electromagnetic wave of the second transmission unit II and the reflection phase of the electromagnetic wave of the first transmission unit I to satisfy the above relationship, the energy of the reflected electromagnetic waves can be more significantly dispersed toward the surroundings, so that the reflected electromagnetic waves cannot form images on the reflection side. Specifically, the reflection phase difference between the two transmission units may be 0.6π, 0.7π, 0.8π, 0.9π, 1.0π, 1.1π, 1.2π, 1.3π or 1.4π.

Figure 8A:
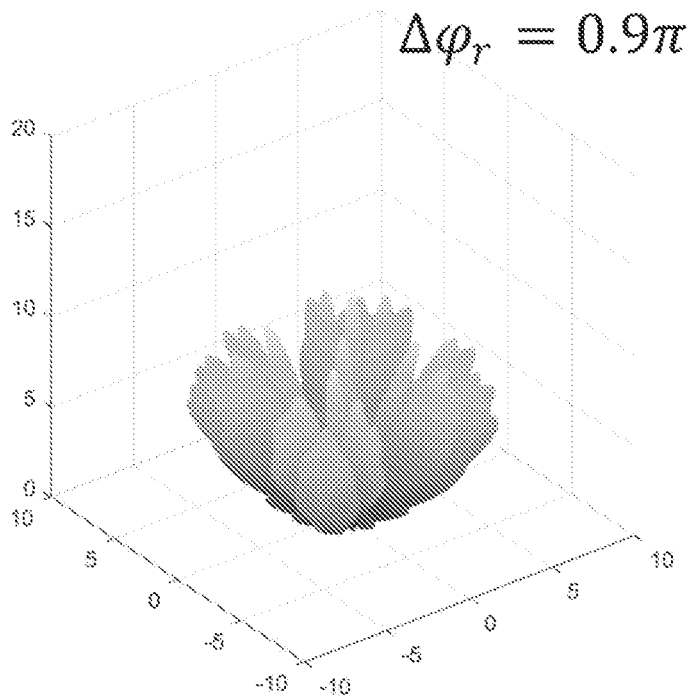
FIGS. 8(a)-(c) are far-field radiation power patterns on a reflection side when the first transmission unit I and the second transmission unit II of the embodiment shown in FIG. 2(a) take different reflection phase differences, respectively.
Figure 8B:
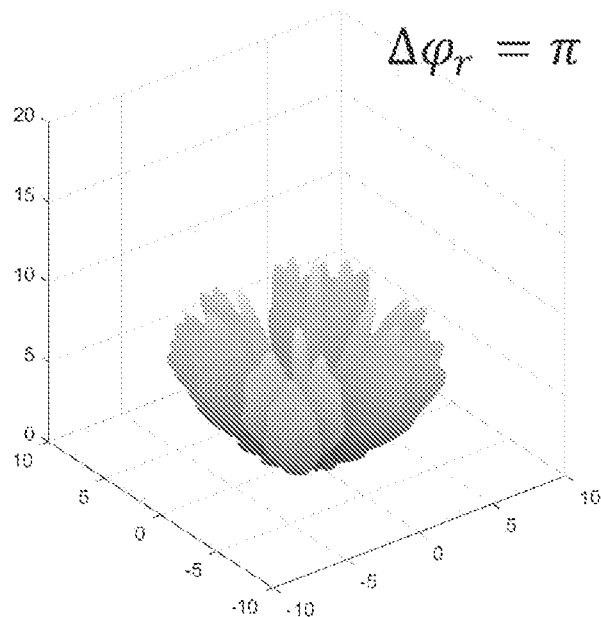
Figure 8C:
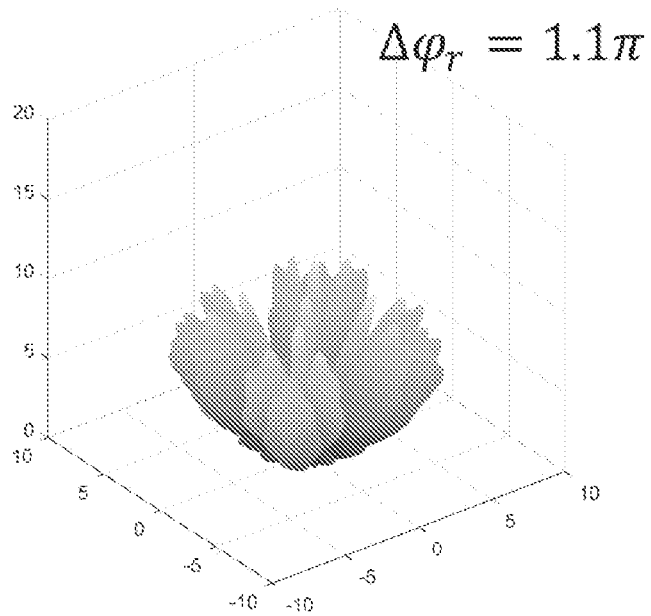

Specifically, taking the transmission structure 100 shown in FIG. 2(a) as an example, the reflection phase difference between the first transmission unit I and the second transmission unit II is adjusted separately. FIGS. 8(a) to 8(c) respectively show far-field radiation power patterns on the reflection side when the difference $\Delta\varphi_r$ between the reflection phase $\varphi_{r2}$ of the electromagnetic wave of the second transmission unit II and the reflection phase $\varphi_{r1}$ of the electromagnetic wave of the first transmission unit I is 0.9π, 1π, and 1.1π, respectively, and the electromagnetic waves are vertically incident to the transmission structure 100. It can be seen that the energy of the reflected electromagnetic waves in the above cases is dispersed toward the surroundings, so that the electromagnetic waves reflected on the reflection side of the transmission structure 100 cannot form images. Specifically, the maximum values of the energy of the reflected waves in FIGS. 8(a) to 8(c) are each approximately 3.2% of the maximum value of the energy of the reflected waves of the uniform structure shown in FIG. 6(a).

Further, upon satisfying the above relationship of the reflection phase, the modulus $r_2$ of the reflection coefficient of the electromagnetic wave of the second transmission unit II and the modulus $r_1$ of the reflection coefficient of the electromagnetic wave of the first transmission unit I satisfy $0.25 \leq r_2/r_1 \leq 4$. By controlling the reflectance of the electromagnetic wave of the second transmission unit II and the reflectance of the electromagnetic wave of the first transmission unit I to satisfy the above relationship, the energy of the reflected electromagnetic wave can have a significant energy dispersion effect on the reflection side of the transmission structure 100, further ensuring that the reflected electromagnetic wave cannot form images on the reflection side. Specifically, the ratio of the moduli of the reflection coefficients of the two transmission units may be 0.25, 0.5, 0.75, 1.25, 1.5, 1.75, 2, 3, or 4.

Figure 9A:
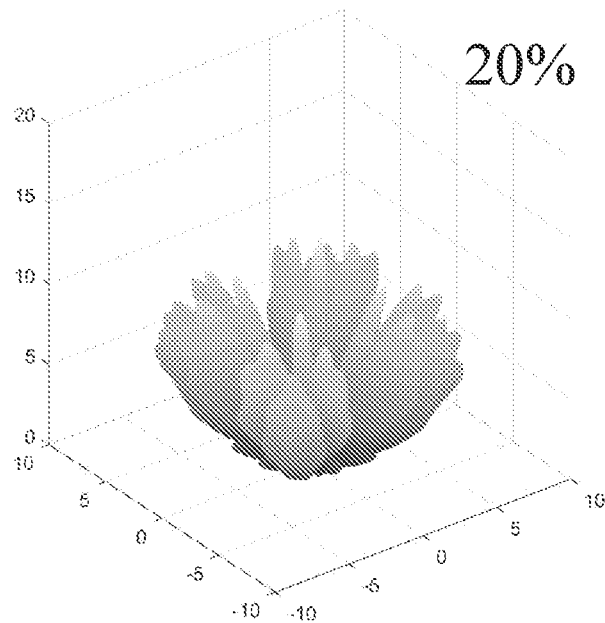
FIGS. 9(a)-(c) are far-field radiation power patterns on a reflection side when a ratio of a modulus of a reflection coefficient of a second transmission unit II to a modulus of a reflection coefficient of a first transmission unit I of the embodiment shown in FIG. 2(a) takes different values, respectively.
Figure 9B:
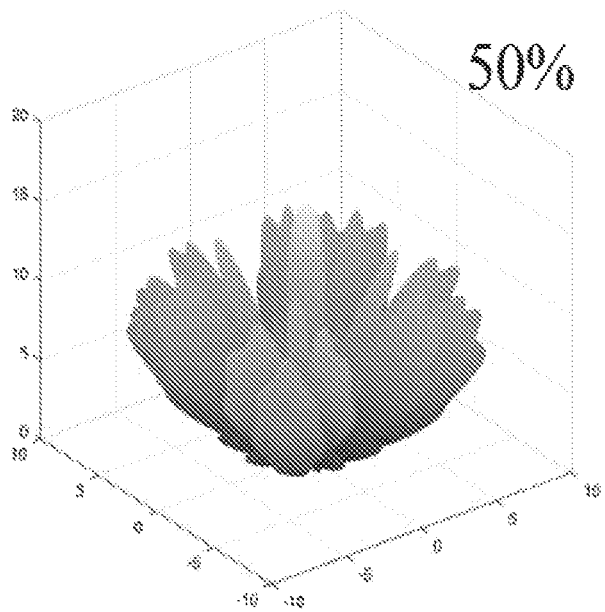
Figure 9C:
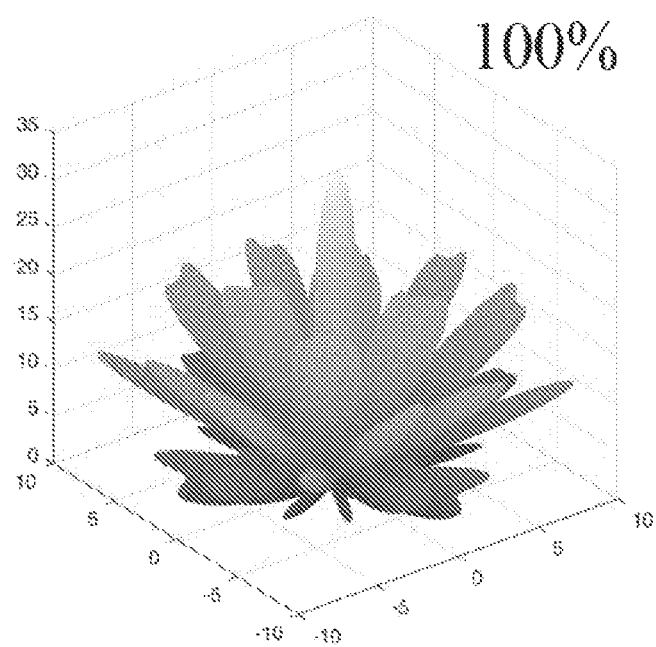

Specifically, still taking the transmission structure 100 shown in FIG. 2(a) as an example, the ratio of the modulus of the reflection coefficient of the first transmission unit I and the modulus of the reflection coefficient of the second transmission unit II is adjusted separately. FIGS. 9(a) to 9(c) respectively show far-field radiation power patterns on the reflection side when the modulus $r_2$ of the reflection coefficient of the electromagnetic wave of the second transmission unit II are 20%, 50%, and 100% greater than the modulus $r_1$ of the reflection coefficient of the electromagnetic wave of the first transmission unit I, respectively. In this case, $r_2/r_1$ is 1.2, 1.5, and 2, respectively, and the electromagnetic wave is vertically incident to the transmission structure 100. It can be seen that in the above case, the energy of the reflected electromagnetic wave is disorderly distributed in various directions in the space, so that the reflected electromagnetic wave cannot form images on the reflection side of the transmission structure 100. Of course, the modulus $r_2$ of the reflection coefficient of the electromagnetic wave of the second transmission unit II can also be 20%, 50%, and 100% less than the modulus $r_1$ of the reflection coefficient of the electromagnetic wave of the first transmission unit I. In this case, $r_2/r_1$ is 5/6, 2/3, and 1/2, respectively.

In addition, by adjusting its own size, the above transmission structure can further be applied to different wave bands, such as the visible light band and the microwave band. It should be noted that, the transmission structures with different disordered arrangement forms correspond to different transmission phase differences, reflection phase differences and differences of moduli of the reflection coefficients when realizing the single-sided imaging, and the technicians can adjust the disordered arrangement of the transmission structure according to the actual requirements of the transmission and reflection coefficient conditions to achieve a better effect of single-sided imaging.

In some embodiments, the aforementioned transmission structure may be designed by adjusting the effective relative dielectric constant and the effective relative magnetic permeability of the material.

Specifically, a thickness of the first transmission unit I and a thickness of the second transmission unit II in the normal direction of the incident surface of the transmission structure may be set to be equal, while a value $\varepsilon_1$ of an effective relative dielectric constant of the first transmission unit I may be set to be equal to a value of an effective relative magnetic permeability $\mu_2$ of the second transmission unit II, a value of an effective relative magnetic permeability of the first transmission unit I may be set to be equal to a value of an effective relative dielectric constant $\varepsilon_2$ of the second transmission unit II. Therefore, according to the transmission matrix theory in wave optics, the transmission matrix of the first transmission unit I can be obtained as $$M_1 = \begin{bmatrix} \cos\delta_1 & -\dfrac{i}{\eta_1}\sin\delta_1 \\ -i\eta_1\sin\delta_1 & \cos\delta_1 \end{bmatrix} = \begin{bmatrix} A_1 & B_1 \\ C_1 & D_1 \end{bmatrix},$$

$A_1$, $B_1$, $C_1$, and $D_1$ are the corresponding transmission matrix elements respectively, $$\eta_1 = \sqrt{\dfrac{\mu_1}{\varepsilon_1}}\,\eta_0$$

represents the impedance of the first transmission unit I, $\delta_1$ represents the longitudinal optical path of the electromagnetic wave in the first transmission unit I, it can be derived that, the transmission coefficient of the electromagnetic wave passing through the first transmission unit I is $$t_1 = \frac{2\eta_0}{A_1\eta_0 + B_1\eta_0\eta_g + C_1 + D_1\eta_g},$$

and the reflection coefficient of the electromagnetic wave by the first transmission unit I is $$r_1 = \frac{A_1\eta_0 + B_1\eta_0\eta_g - C_1 - D_1\eta_g}{A_1\eta_0 + B_1\eta_0\eta_g + C_1 + D_1\eta_g},$$

$\eta_0$ and $\eta_g$ respectively represent the impedance of the material on the incident side and the impedance of the material on the exit side of the transmission structure, they usually have the same background material, such as air, therefore $\eta_0 = \eta_g$. Similarly, the transmission matrix of the second transmission unit II is $$M_2 = \begin{bmatrix} \cos\delta_2 & -\frac{i}{\eta_2}\sin\delta_2 \\ -i\eta_2\sin\delta_2 & \cos\delta_2 \end{bmatrix} = \begin{bmatrix} A_2 & B_2 \\ C_2 & D_2 \end{bmatrix},$$

and in combination with the aforementioned conditions, it can be seen that, $$\eta_1 = \frac{1}{\eta_2},$$

$\delta_1 = \delta_2$, therefore it can be further calculated that, $t_1 = t_2$, $r_j = -r_2$, that is, in this case, the transmission phases, the transmittances, and the reflectances of the first transmission unit I and the second transmission unit II are the same, and the reflection phase difference therebetween is $\pi$, which satisfies the requirements for single-sided imaging of the aforementioned transmission structure.

Further, the first transmission unit I can be configured as a metal rod array and a metal split ring array having a first arrangement structure, the second transmission unit II can be configured as a metal rod array and a metal split ring array having a second arrangement structure, and the first arrangement structure is different from the second arrangement structure. The metal rod array can be used to adjust electrical resonance of the material, so as to adjust the effective relative dielectric constant of the material. The metal ring array can be used to adjust magnetic resonance of the material, so as to adjust the effective relative magnetic permeability of the material. Therefore, by respectively adjusting the arrangement structures of the metal rod array and the metal ring array in the two transmission units, the value of the effective relative dielectric constant $\varepsilon_1$ of the first transmission unit I can be equal to the value of the effective relative magnetic permeability $\mu_2$ of the second transmission unit II, and the value of the effective relative magnetic permeability $\mu_1$ of the first transmission unit I can be equal to the value of the effective relative dielectric constant $\varepsilon_2$ of the second transmission unit II.

In another embodiment, the first transmission unit I and the second transmission unit II have a metal rod array and a metal split ring array of the same arrangement structure, for example, the metal rods are arranged in one of the metal split rings to form a structure of a shape "E", and then by adjusting a size of the metal rod of each of the transmission units and a size of the metal split ring in each of the transmission units, the value of the effective relative dielectric constant $\varepsilon_1$ of the first transmission unit I can be equal to the value of the effective relative magnetic permeability $\mu_2$ of the second transmission unit II, and the value of the effective relative magnetic permeability $\mu_1$ of the first transmission unit I can be equal to the value of the effective relative dielectric constant $\varepsilon_2$ of the second transmission unit II. It can be understood that the size of the metal rod includes but is not limited to a length, a width and a thickness of the metal rod, and the size of the metal split ring includes but is not limited to an inner diameter and a thickness of the metal split ring.

It should be noted that the materials in nature can also be used to prepare the transmission structure of this embodiment. For example, the relative dielectric constants of the nickel-zinc ferrite materials can be adjusted in a range of 10-1000, and the relative magnetic permeabilities of magnetic materials existing in nature and the effective relative magnetic permeabilities of artificial composite materials can also cover a large range. Therefore, by selecting two suitable uniform materials in nature, the value of the relative dielectric constant of the first transmission unit I can be equal to the value of the relative magnetic permeability of the second transmission unit II, and the value of the relative magnetic permeability of the first transmission unit I can be equal to the value of the relative dielectric constant of the second transmission unit II.

In some embodiments, the first transmission unit I includes a first portion and a second portion that are sequentially arranged in a normal direction of an incident surface of the transmission structure, the first portion and the second portion have different effective relative dielectric constants and/or have different effective relative magnetic permeabilities. The second transmission units II includes the second portion and the first portion that are sequentially arranged in the normal direction of the incident surface of the transmission structure. If shifting the first transmission unit I without rotating the first transmission unit I to make the first transmission unit I be stacked with the second transmission unit II along the normal direction of the incident surface of the transmission structure, the first transmission unit I and the second transmission unit II would be mirror symmetrical with respect to a plane parallel to the incident surface of the transmission structure. Here, the incident surface of the transmission structure refers to the incident surface of the electromagnetic wave on the transmission structure. For example, when the first transmission unit I and the second transmission unit II are cubes, the incident surface may be formed by the arrangement of the surfaces on the incident side of the plurality of first transmission units I and the plurality of second transmission units II. When the first transmission unit I and the second transmission unit II are spheres, the incident surface may be formed by the arrangement of the tangent planes at the incident portions of the plurality of first transmission units I and the plurality of second transmission units II. When the first transmission unit I and the second transmission unit II are irregular shape bodies, the incident surface may also be formed by the arrangement of the tangent planes at the incident portions of the plurality of first transmission units I and the plurality of second transmission units II.

Specifically, the first transmission unit I includes various forms, such as the first transmission units 11, 21, 31, 41, and 51 shown in FIGS. 10 to 14. The first transmission units 11, 21, 31, 41, and 51 have electromagnetic wave incident surfaces P11, P21, P31, P41, and P51, respectively. Accordingly, the second transmission unit II also includes various forms, such as the second transmission units 12, 22, 32, 42 and 52 shown in FIGS. 10 to 14. The second transmission units 12, 22, 32, 42 and 52 have electromagnetic wave incident surfaces P12, P22, P32, P42 and P52, respectively.

Figure 10:
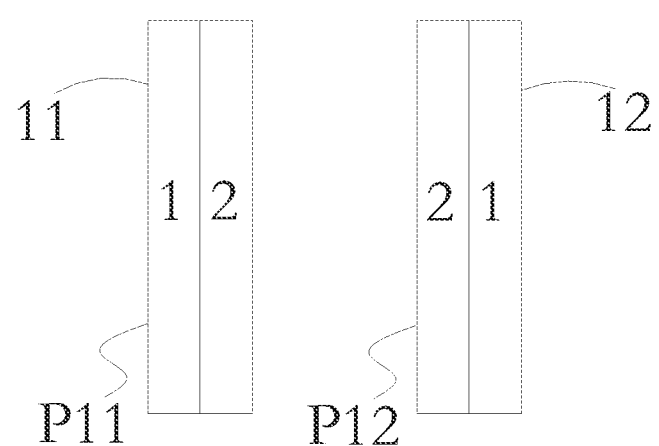
FIG. 10 is a structure schematic diagram of a first transmission unit 11 and a second transmission unit 12 according to an embodiment of the present disclosure.

As shown in FIG. 10, the first transmission unit 11 is formed by arranging two materials with different dielectric constants and/or different magnetic permeabilities in the normal direction of the incident surface of the transmission structure. In this case, the first portion 1 and the second portion 2 thereof are single materials with different dielectric constants and/or different magnetic permeabilities, respectively. Accordingly, the second transmission unit 12 is formed by arranging the second portion 2 and the first portion 1 in the normal direction of the incident surface of the transmission structure, and a plurality of incident surfaces 11 and a plurality of incident surfaces 12 are arranged to form an incident surface of the transmission structure (the incident surface of the transmission structure in the following embodiments are formed in a similar manner to this embodiment, so they are not described again). According to the transmission matrix theory, the transmission matrix of the first transmission unit 11 can be obtained as $$M_1 = \begin{bmatrix} A_1 & B_1 \\ C_1 & D_1 \end{bmatrix},$$

$A_1$, $B_1$, $C_1$, and $D_1$ are the corresponding transmission matrix elements, respectively, and are related to the dielectric constants and magnetic permeabilities of the first portion 1 and the second portion 2. It can be derived that, the transmission coefficient of the electromagnetic wave passing through the first transmission unit 11 is $$t_1 = \frac{2\eta_0}{A_1\eta_0 + B_1\eta_0\eta_g + C_1 + D_1\eta_g},$$

and the reflection coefficient of the electromagnetic wave by the first transmission unit 11 is $$r_1 = \frac{A_1\eta_0 + B_1\eta_0\eta_g - C_1 - D_1\eta_g}{A_1\eta_0 + B_1\eta_0\eta_g + C_1 + D_1\eta_g},$$

Similarly, in combination with the aforementioned conditions, it can be derived that the transmission matrix of the second transmission unit 12 is $$M_2 = \begin{bmatrix} A_2 & B_2 \\ C_2 & D_2 \end{bmatrix} = \begin{bmatrix} D_1 & B_1 \\ C_1 & A_1 \end{bmatrix},$$

and it is further obtained that the transmission coefficient of the electromagnetic wave passing through the second transmission unit 12 is $$t_2 = \frac{2\eta_0}{D_1\eta_0 + B_1\eta_0\eta_g + C_1 + A_1\eta_g},$$

and the reflection coefficient of the electromagnetic wave by the second transmission unit 12 is $$r_2 = \frac{D_1\eta_0 + B_1\eta_0\eta_g + C_1 + A_1\eta_g}{D_1\eta_0 + B_1\eta_0\eta_g + C_1 + A_1\eta_g}.$$

The background medium is usually a uniform material such as air, therefore $\eta_0=\eta_g$, and it can be further seen that the first transmission unit 11 and the second transmission unit 12 have the same transmission coefficient, but the first transmission unit 11 has a reflection coefficient different from a reflection coefficient of the second transmission unit 12. Specifically, the reflection phase of the first transmission unit 11 may be different from the reflection phase of the second transmission unit 12, or the modulus of the reflection coefficient and the reflection phase of the first transmission unit 11 may be different from the modulus of the reflection coefficient and the reflection phase of the second transmission unit 12.

Figure 11:
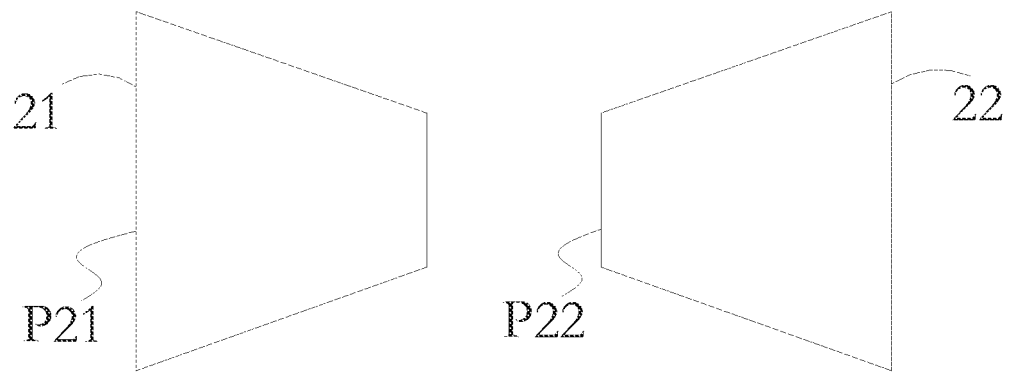
FIG. 11 is a schematic structural diagram of a first transmission unit 21 and a second transmission unit 22 according to another embodiment of the present disclosure.

In some embodiments, as shown in FIG. 11, the first transmission unit 21 and the second transmission unit 22 are formed of the same single material, and a shape of one side of the first portion away from the second portion is different from a shape of one side of the second portion away from the first portion. Taking FIG. 11 as an example, the single material may be a trapezoidal material. In the first transmission unit 21, a lower bottom surface of the trapezoidal material is an incident surface P21 of the electromagnetic wave, and an upper bottom surface thereof is an exit surface of the electromagnetic wave. In this case, the first portion of the first transmission unit 21 is the part including the incident surface P21, and correspondingly, the second portion thereof is the other part including the exit surface. Correspondingly, in the second transmission unit 22, the upper bottom surface of the trapezoidal material is an incident surface P22 of the electromagnetic wave, and the lower bottom surface thereof is an exit surface of the electromagnetic wave. Through the transmission matrix theory, it can also be proved that the first transmission unit 21 and the second transmission unit 22 have the same transmission coefficient, but the first transmission unit 21 has a reflection coefficient different from a reflection coefficient of the second transmission unit 22. It can be understood that the shape of the single material may also be a triangle, a fan shape, or other shapes, and this embodiment does not limit the specific shape of the single material.

Figure 12:
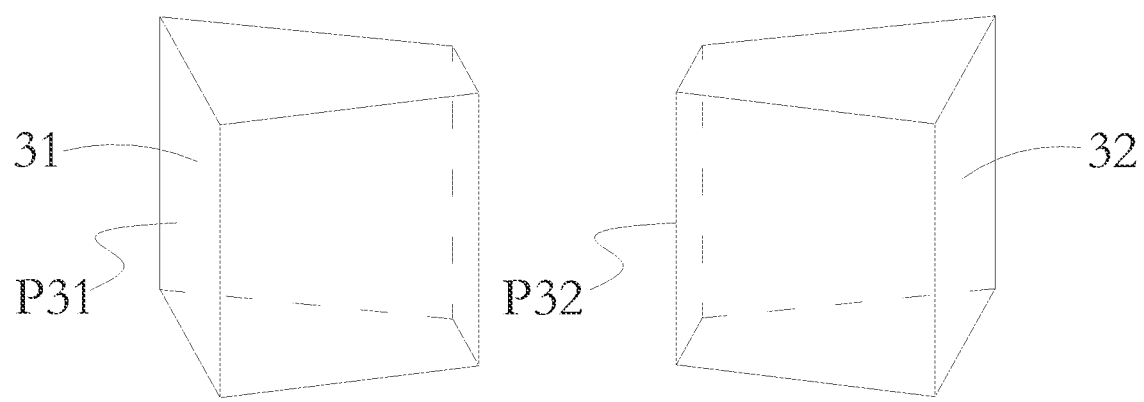
FIG. 12 is a schematic structural diagram of a first transmission unit 31 and a second transmission unit 32 according to another embodiment of the present disclosure.

In some embodiments, the above single materials may all be light-transmitting materials, so as to achieve the effect of single-sided imaging in the optical frequency band in this embodiment. The light-transmitting material includes at least one of glass, resin, transparent crystal, liquid crystal, transparent liquid, and gas. Furthermore, the light-transmitting material may be glass, resin, transparent crystal (such as crystal), liquid crystal, transparent liquid or air. The transparent liquid includes water, sodium chloride solution, alcohol, and other transparent non-metallic liquids. When glass is used as the light-transmitting material, as shown in FIG. 12, the first transmission unit is configured as a trapezoidal first glass base body 31, and the second transmission unit is configured as a trapezoidal second glass base body 32. After the trapezoidal first glass base bodies 31 and the trapezoidal second glass base bodies 32 are disorderly arranged on a surface, glass enabling single-sided imaging can be prepared, thereby solving the glare problem caused by ordinary glass.

In some embodiments, the first portion and/or the second portion may be formed by compounding at least two different materials, so that the effective relative dielectric constant of the first portion is different from the effective relative dielectric constant of the second portion, and/or the effective relative magnetic permeability of the first portion is different from the effective relative magnetic permeability of the second portion. The effective parameters of the composite material can be calculated by Maxwell-Garnett theory, Bruggeman theory, and the like, according to corresponding applicable conditions.

Figure 13:
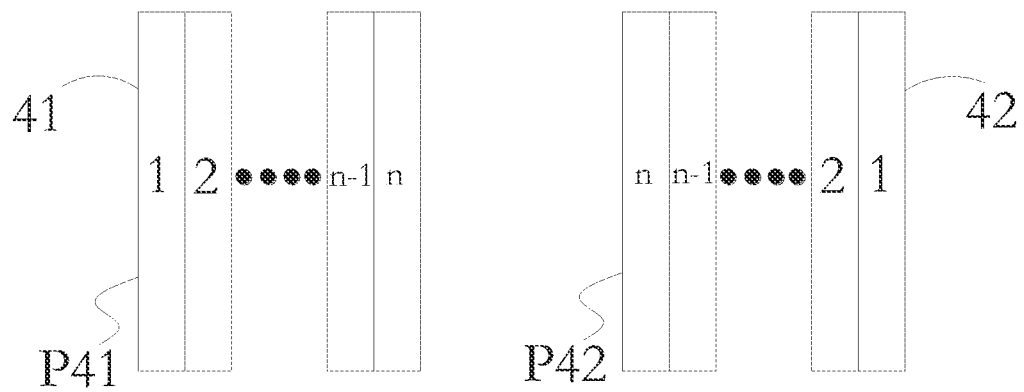
FIG. 13 is a schematic structural diagram of a first transmission unit 41 and a second transmission unit 42 according to another embodiment of the present disclosure.
Figure 14:
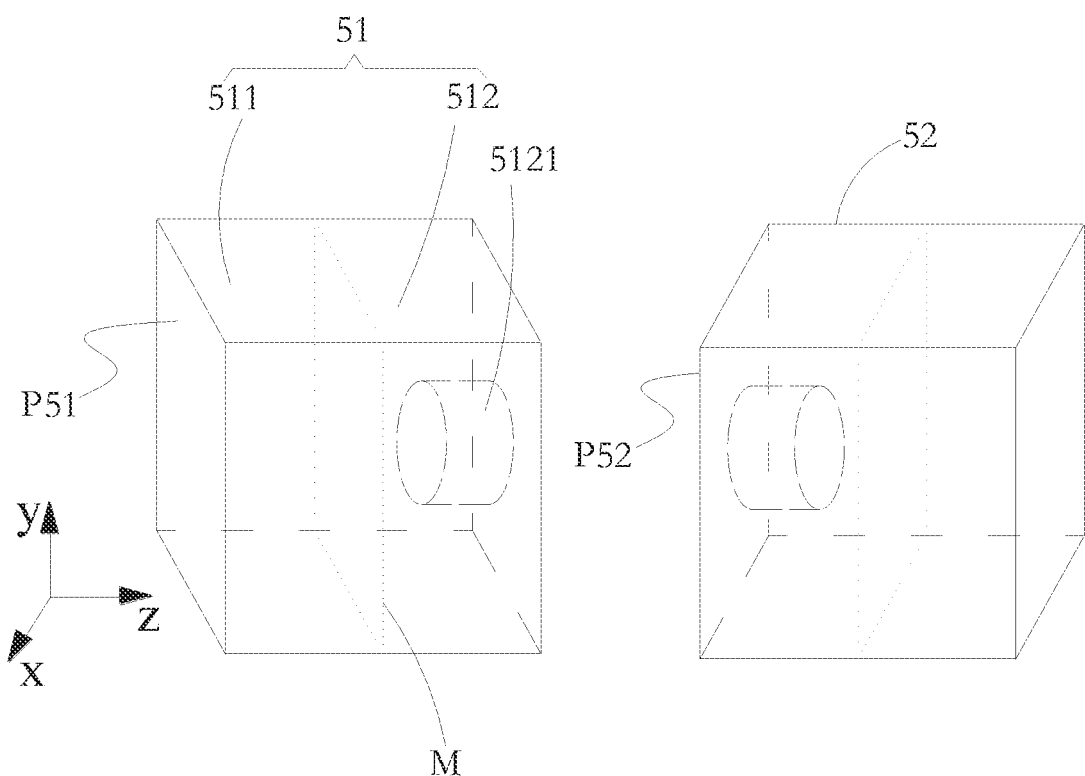
FIG. 14 is a schematic structural diagram of a first transmission unit 51 and a second transmission unit 52 according to another embodiment of the present disclosure.
Figure 15A:
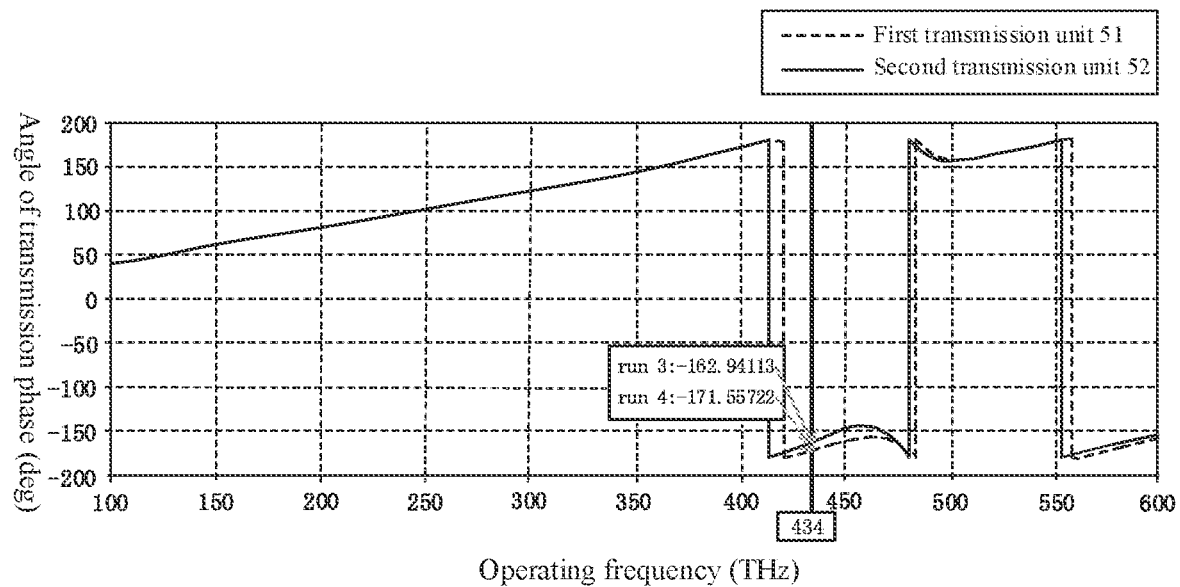
FIGS. 15(a)-(d) show a transmission phase curve, a reflection phase curve, a transmittance curve, and a reflectance curve of an electromagnetic wave when the electromagnetic wave is incident on the first transmission unit 51 and the second transmission unit 52 of the embodiment shown in FIG. 14, respectively.
Figure 15B:
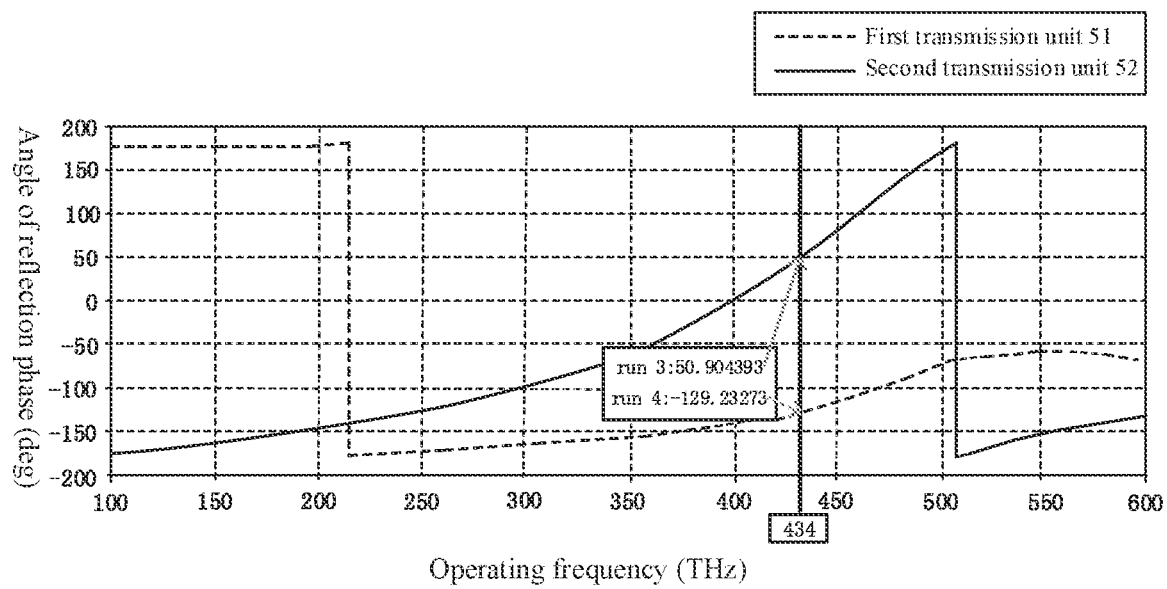
Figure 15C:
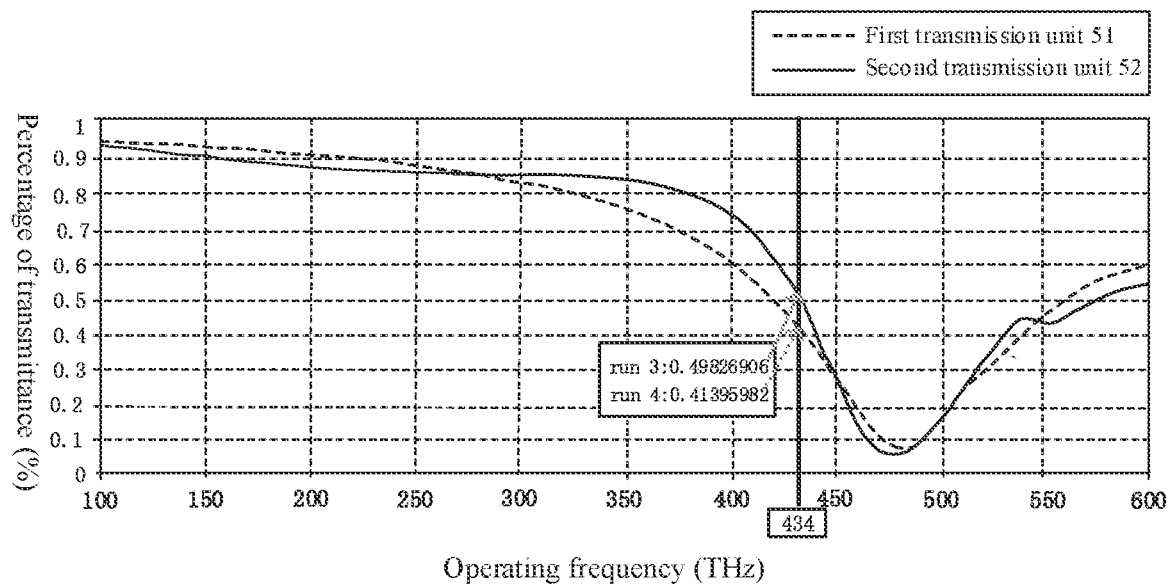
Figure 15D:
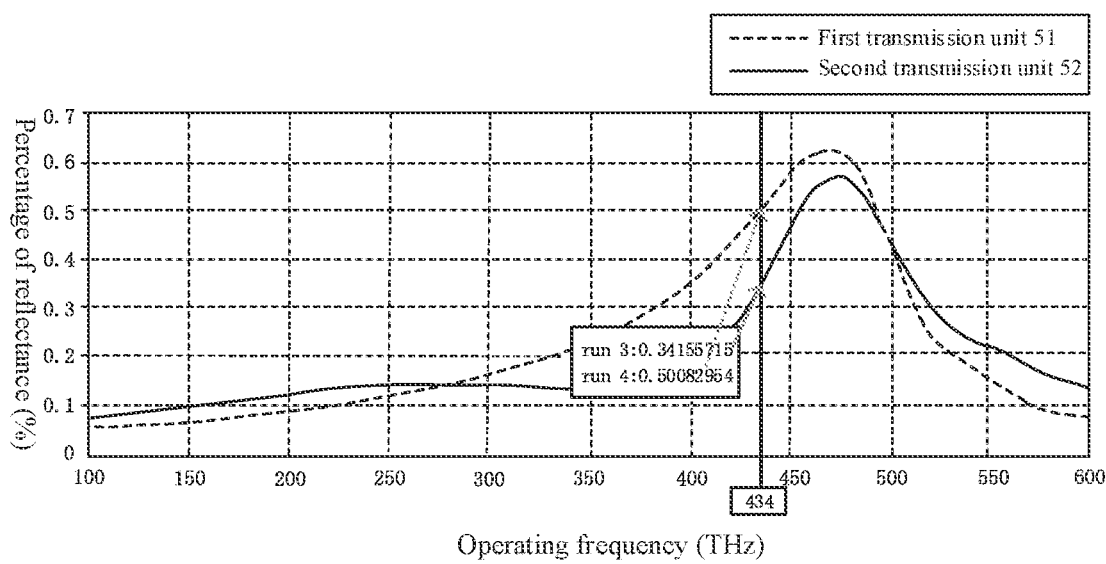

As shown in FIG. 13, the first portion and the second portion of the first transmission unit 41 are formed by arranging a plurality of materials with different dielectric constants and/or magnetic permeabilities in the normal direction of the incident surface of the transmission structure, that is, the first transmission unit 41 is formed by the arrangement of material 1, material 2 . . . material n–1, material n, and correspondingly, the second transmission unit 42 is formed by the arrangement of material n, material n–1 . . . material 2, material 1. Similarly, through the transmission matrix theory, it can also be proved that, for the electromagnetic wave, the first transmission unit 41 and the second transmission unit 42 have the same transmission coefficient, but the first transmission unit 21 has a reflection coefficient different from a reflection coefficient of the second transmission unit 22. In this embodiment, the effective relative dielectric constants and the effective relative magnetic permeabilities of the first portion and the second portion can be calculated by Maxwell-Garnett theory.

Further, the first portion and the second portion of the first transmission unit 41 and the second transmission unit 42 are each formed of a light-transmitting material, so as to realize the effect of single-sided imaging in the optical frequency band in this embodiment. Further, the first portion and the second portion of this embodiment are each configured as a film layer structure, so that an optical thin film having the effect of single-sided imaging can be prepared. This optical thin film can be used as a screen film for mobile devices such as mobile phones, tablets, and the like, and can also be used as an external film for building curtain walls and car windshields, thereby avoiding visual fatigue or uncomfortable of human eyes caused by the reflection of light sources with unsuitable brightness in the surrounding environment, and further reducing optical pollutions such as glare. There are many common transparent film layer materials, such as silicon oxide and titanium oxide thin films.

In some embodiments, the first portion of the first transmission unit 51 includes a first base body 511, the second portion thereof includes a second base body 512, and a first embedded block is disposed on a surface of or inside the first base body 511, and/or, a second embedded block is disposed on a surface of or inside the second base body 512. Taking the example shown in FIG. 14, there is no embedded block inside the first base body 511, and an embedded block 5121 is disposed inside the second base body. In this case, the embedded block 5121 can be placed at any position in the second portion. A plurality of the embedded blocks 5121 can also exist. Of course, it is also possible to dispose a first embedded block in the first base body 511 and to dispose a second embedded block in the second base body 512. In this case, the shape and/or material of the first embedded block are/is required to be different from those and/or that of the second embedded block, or the position of the first embedded block in the first base body 511 and the position of the second embedded block in the second base body 512 make the first portion form an asymmetric structure, so as to ensure that the effective dielectric constant and/or effective magnetic permeability of the first portion of the first transmission unit 51 are different from those and/or that of the second portion of the first transmission unit 51. Moreover, since metal particles have been widely used in nano-processing technology, in addition to be a dielectric block, the embedded block 5121 can also be a metal embedded block, such as a copper block, an iron block, a silver block, and the like.

Further, a side of the first portion away from the second portion is an incident side, and a side of the second portion away from the first portion is an exit side. A shape of the incident side may be the same as a shape of the exit side. Taking the example shown in FIG. 14, the first base body 511 is the first portion, the second base body 512 is the second portion, the first transmission unit 51 is configured as a cube, and the embedded block 5121 is configured as a cylinder and extends inward from the exit surface of the transmission structure. If shifting the first transmission unit 51 without rotating the first transmission unit 51 to make the first transmission unit 51 be stacked with the second transmission unit 52 along the normal direction of the incident surface of the transmission structure, the second transmission unit 52 and the first transmission unit 51 [[are]] would be mirror-symmetrical with respect to the a plane parallel to the incident surface of the transmission structure.

Further, the material of the first base body 511 may be the same as the material of the second base body 512 to facilitate the preparation of the transmission structure. Further, the material may be a light-transmitting material to achieve the effect of single-sided imaging in the optical frequency band in this embodiment. Further, the light-transmitting material may be at least one of glass, resin, transparent crystal, liquid crystal, transparent liquid, and gas, so as to reduce light pollutions such as glare. Of course, the light-transmitting material may specifically be water, sodium chloride solution, alcohol, crystal, transparent plastic, or air, which are common materials in daily life.

The effect of single-sided imaging for the transmission structure composed of the first transmission units 51 and the corresponding second transmission units 52 whose material of base body is glass will be simulated in the following. Specifically, the lengths of the first transmission unit 51 in the x and z directions are both 160 nm, and the length thereof in they direction is 200 nm. The embedded block 5121 is configured as a cylinder with a cross-sectional diameter of 100 nm and a height of 50 nm. One cylindrical surface of the cylinder is disposed at the exit surface of the transmission structure 600, the plane M is the interface between the first base body 511 and the second base body 512 and passes through the center of the first transmission unit 51. Since the second transmission unit 52 and the first transmission unit 51 are mirror-symmetrical with respect to a plane parallel to the incident surface of the transmission structure when shifting the first transmission unit 51 without rotating the first transmission unit 51 to make the first transmission unit 51 be stacked with the second transmission unit 52 along the normal direction of the incident surface of the transmission structure, the structure of the second transmission unit 52 is the same as the structure of the first transmission unit 51, and which will not be repeated here.

FIGS. 15(a)-(d) showing transmission phase curves, reflection phase curves, transmittance curves, and reflectance curves of the first transmission unit 51 and the second transmission unit 52, respectively. In these figures, the transmission and reflection of the first transmission unit 51 is shown by a gray solid line, and the transmission and reflection of the second transmission unit 52 is shown by a gray broken line. Specifically, the ordinates of FIGS. 15(*a*) and 15(*b*) represent the angles of the transmission phase and the reflection phase, respectively, and the abscissas thereof represent the operating frequency. It can be seen that the transmission phases of the first transmission unit 51 and the second transmission unit 52 are basically the same at different frequencies, while the reflection phases thereof show large differences at different frequencies. Among them, the reflection phase difference between the first transmission unit 51 and the second transmission unit 52 reaches 180° at a frequency of 434 THz. The ordinates of FIG. 15(*c*) and FIG. 15(*d*) represent the percentages of the transmittance and the reflectance, respectively, and the abscissas thereof represent the operating frequency. It can be seen that the ratio of the reflectance of the second transmission unit 52 to the reflectance of the first transmission unit 51 is about 1.42 at a frequency of 434 THz, and the corresponding ratio of the modulus of the reflection coefficient of the second transmission unit 52 to the reflectance coefficient of the first transmission unit 51 is 1.2.

Figure 16:
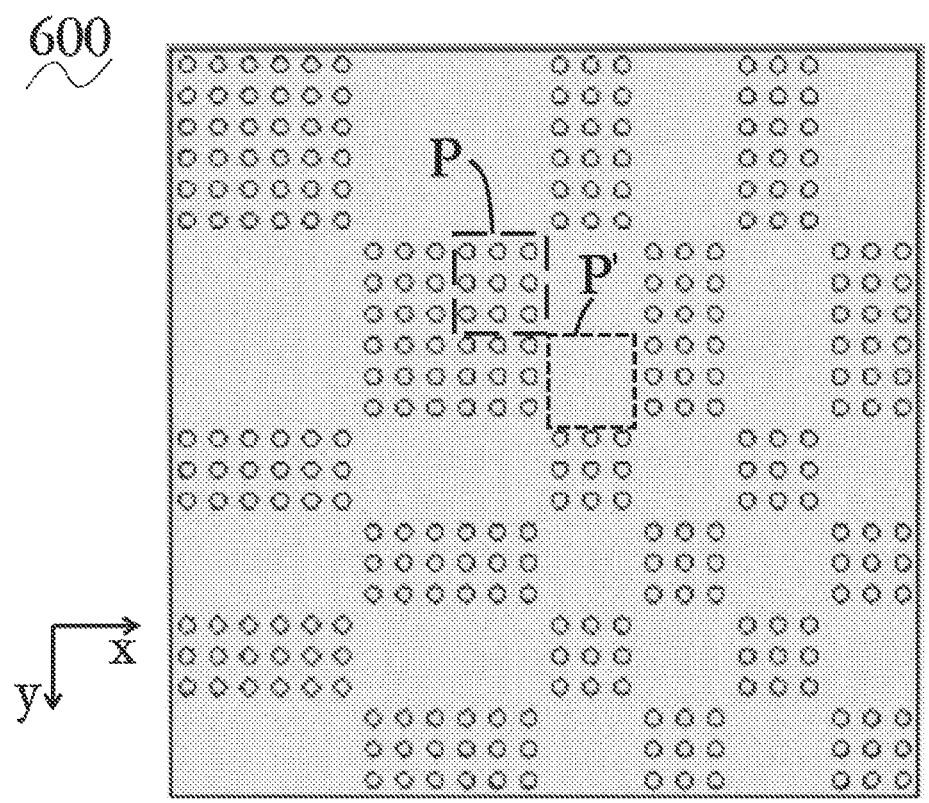
FIG. 16 is a schematic structural diagram of a disordered arrangement of the embodiment shown in FIG. 14.
Figure 17:
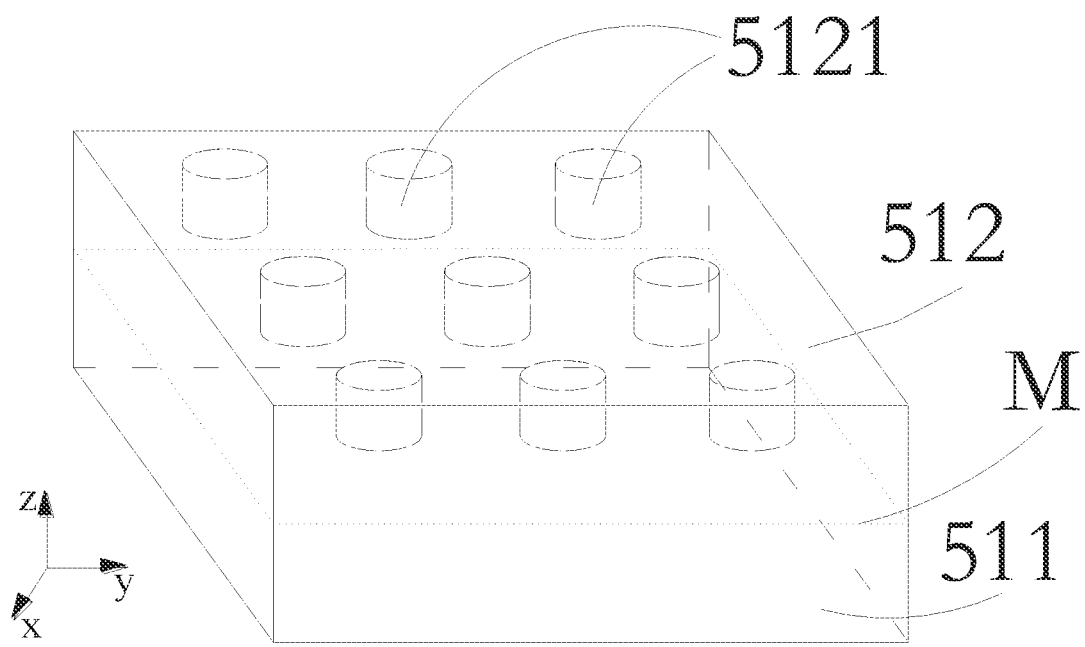
FIG. 17 is a schematic enlarged view of part P of the embodiment shown in FIG. 16.
Figure 18:
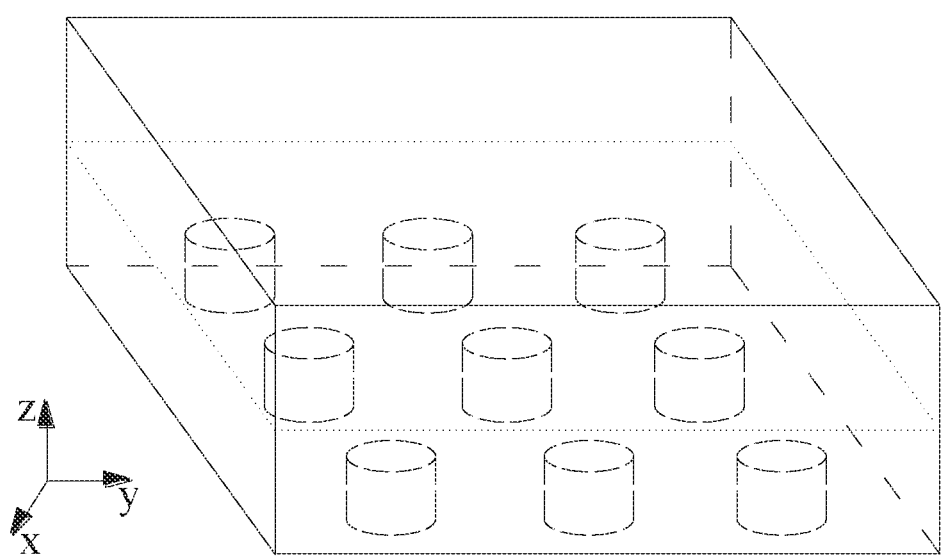
FIG. 18 is a schematic enlarged view of part P' of the embodiment shown in FIG. 16.

As shown in FIG. 16, a plurality of first transmission units 51 and a plurality of second transmission units 52 are arranged randomly and disorderly in the x-y plane, and then a transmission structure 600 is obtained. FIGS. 17 and 18 show enlarged schematic views of the part P and part P' of the transmission structure 600, respectively.

The electromagnetic simulation software CST is used to simulate the far-field radiation of the transmission structure 600, the frequency of the incident light is 434 THz, and the reflection phase difference between the first transmission unit 51 and the second transmission unit 52 is 180° (that is, π), and the incident surface of the transmission structure 600 is parallel to the x-y plane.

Figure 19:
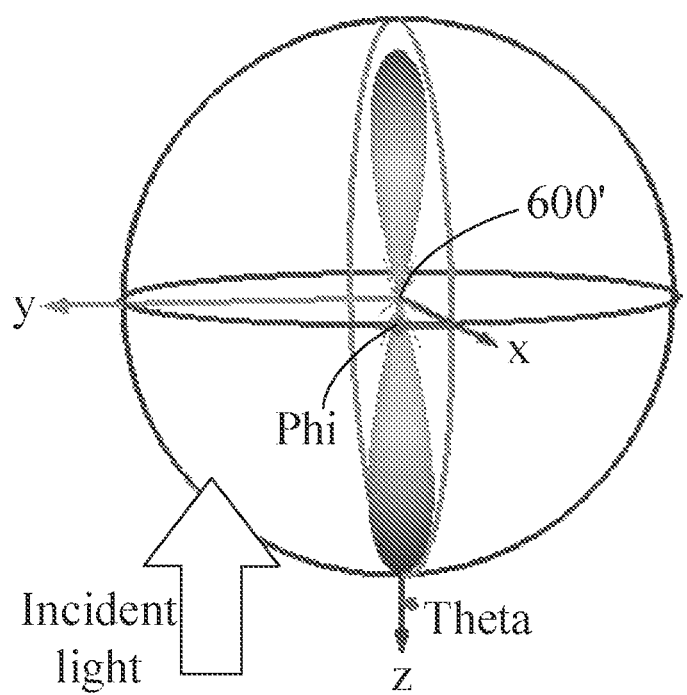
FIG. 19 is a schematic diagram of far-field radiation power pattern when the electromagnetic wave is vertically incident on a uniform transmission structure composed of only the first transmission units 51.
Figure 20:
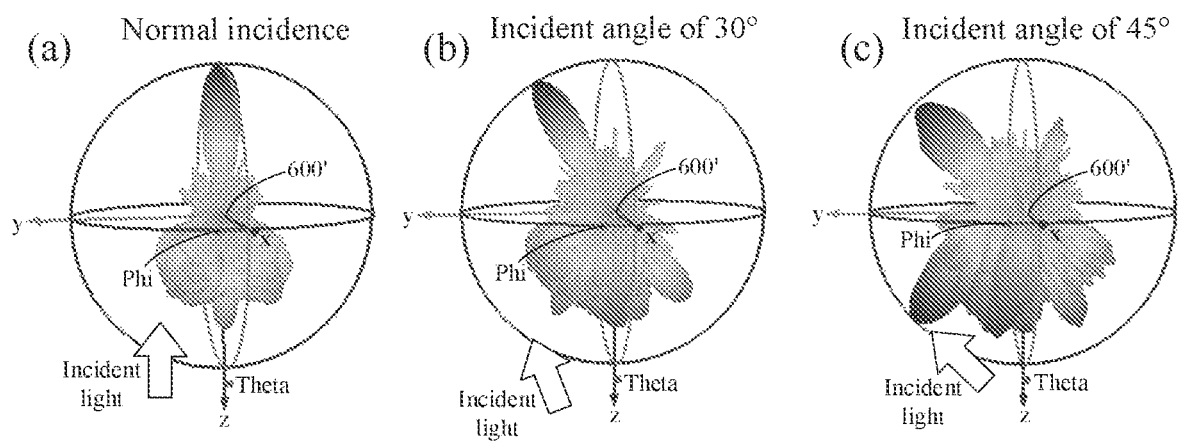
FIGS. 20(a)-(c) are schematic diagrams of far-field radiation power pattern when the electromagnetic wave is incident on the transmission structure of the embodiment shown in FIG. 16 at different incident angles, respectively.

Firstly, as a comparison, the uniform transmission structure 600' composed of only the first transmission units 51 is placed flat in the x-y plane, and light is vertically incident in the z direction to obtain FIG. 19. It can be seen that the light has a large energy concentration area on both the transmission side and the reflection side, that is, the light can form images on both the transmission side and the reflection side; then, the transmission structure 600 is placed flat in the x-y plane, and the light is vertically incident in the z direction to the transmission structure 600 to obtain FIG. 20(*a*), it can be seen that the transmitted light can still form images on the transmission side, but a messy reflection is formed on the reflection side, and the maximum value of the reflected energy of the light is reduced to 1.8% of the maximum value of reflected energy of the light of the uniform transmission structure 600' shown in FIG. 19, so that it can be known that on the reflection side of the transmission structure 600, the energy of the reflected light is dispersed to the surroundings, thereby achieving the effect of single-sided imaging that the reflected light cannot form images but only the transmitted light can form images. Then, light is incident to the transmission structure 600 at an incident angle of 30° to obtain FIG. 20(*b*). It can be seen that the transmitted light can also form images on the transmission side, and the reflected light on the reflection side forms a messy energy distribution toward the surroundings, and the maximum value of the reflected energy of the light is reduced to 2.4% of the maximum value of the reflected energy of the light of the uniform transmission structure 600' in FIG. 19, thereby forming single-sided imaging. Then, light is incident to the transmission structure 600 at an incident angle of 45° for simulation to obtain FIG. 20(*c*). It can be seen that the transmitted light can also form images on the transmission side, and the reflected light on the reflection side forms a messy energy distribution toward the surroundings, and the maximum value of the reflected energy of the light is reduced to 11.3% of the maximum value of the reflected energy of the light of the uniform transmission structure 600' in FIG. 19, thereby forming single-sided imaging. Therefore, the transmission structure 600 has the effect of single-sided imaging at least when the incident angle is 0 to 45°, and also proves that the single-sided imaging of the transmission structure 600 has a characteristic of wide angle. It can be further inferred that when the transmission structure 600 has a disordered arrangement along a curved surface, the effect of single-sided imaging can still be achieved at least in part of the area of the transmission structure 600.

Figure 21:
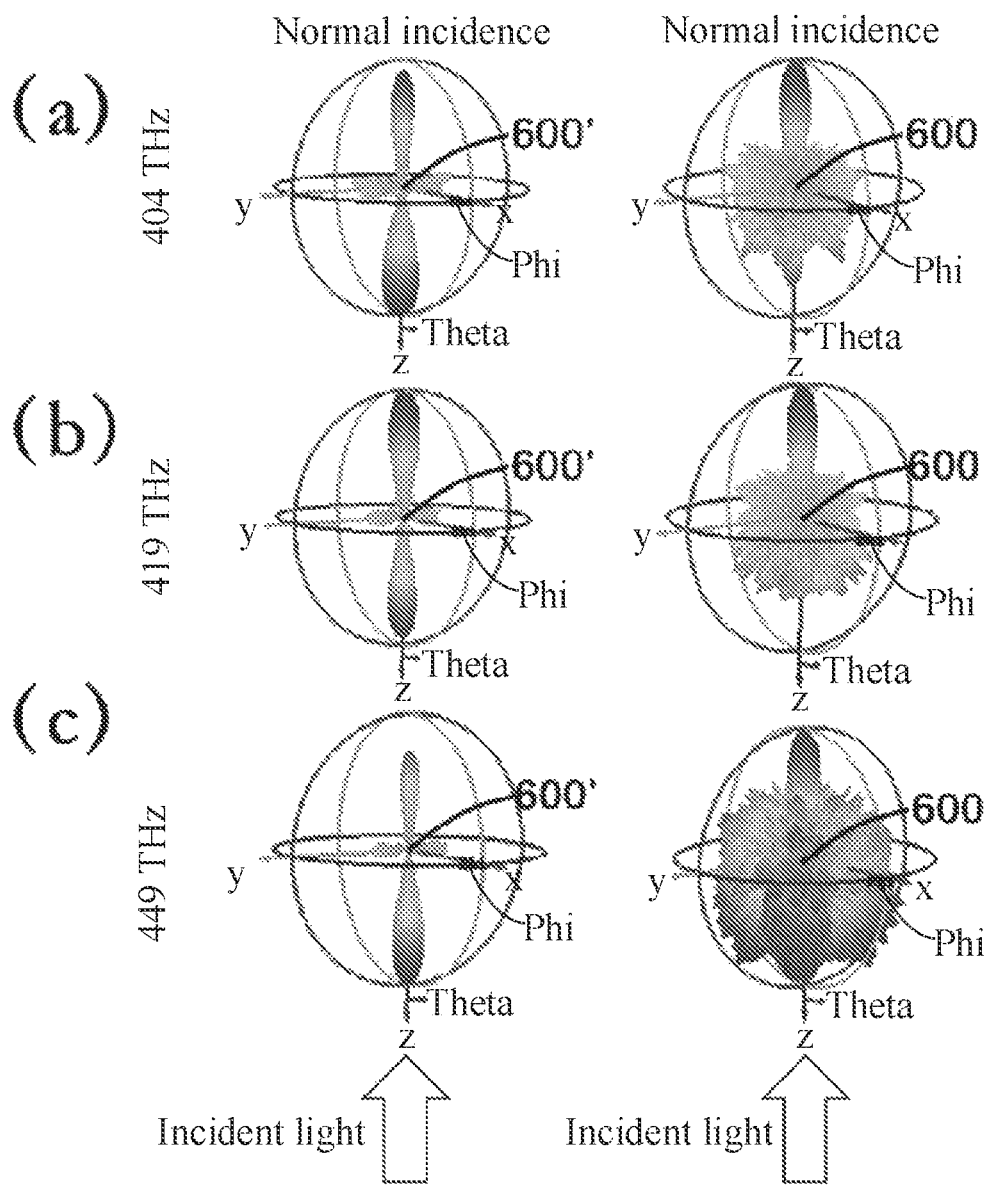
FIGS. 21(a)-(c) are schematic diagrams of far-field radiation power pattern when the electromagnetic wave is incident on the transmission structure of the embodiment shown in FIG. 16 at different frequencies, respectively.

Further, a frequency (400 THz to 450 THz) with a phase difference close to 180° may also be selected as the operating frequency of the transmission structure 600, that is, the effect of single-sided imaging of the transmission structure 600 further has a characteristic of wide band. As shown in FIGS. 21(*a*) to 21(*c*), the inventors respectively use light at frequencies of 404 THz, 419 THz, and 449 THz to vertically incident to the transmission structure 600 in the z direction for simulation. It can be seen that, in FIGS. 21(*a*) to 21(*c*), all the incident light can form images on the transmission side after the incident light is transmitted, and the reflected light on the reflection side all form a messy energy distribution toward the surroundings. Compared with the uniform transmission structure 600' in FIG. 19, the maximum values of the reflected energy of the light of the transmission structure 600 at the above frequencies are reduced to 8.5% (corresponding to a frequency of 404 THz), 1.5% (corresponding to a frequency of 419 THz) and 3.0% (corresponding to a frequency of 449 THz) of the maximum value of the reflected energy of the light of the uniform transmission structure 600'.

The above transmission structure 600 can make the incident light to form images on the transmission side but not form images on the reflection side within a wide frequency range and a wide angle range, thereby effectively eliminating optical pollutions such as glare caused by ordinary glass, and at the same time, it will not affect the information acquisition of human eyes, thereby greatly facilitating people's lives.

The present disclosure further provides a film including the transmission structure as described above.

The above film can be affixed to the screen of electronic apparatus such as mobile phones and tablets, or to the windshields of cars, so that people can not only avoid visual fatigue caused by the reflection of light sources with unsuitable brightness in the surrounding environment, but also obtain the light information transmitted through the film.

The present disclosure further provides an electronic apparatus including a display device and the film as described above disposed on a surface of the display device.

In the above electronic apparatus, by affixing the transmission imaging and reflection non-imaging film as described above on the surface of the display device, the display information of electronic apparatus can be obtained, while visual fatigue of human eyes due to the reflection imaging of the surrounding environment on the surface of the display device will not be caused.

The present disclosure further provides a resin sheet including the transmission structure as described above.

The above resin sheet can be used to prepare a resin lens, so that when light is incident to the resin lens, the reflected light is diffusely reflected on the incident surface and only the transmitted light can form images, thereby improving the imaging quality of the resin lens.

The present disclosure further provides a glass including the transmission structure as described above.

The above glass can be used in the preparation of building glass or automobile windshield glass, so that when light incident to the glass surface, the reflected light is diffusely reflected on the incident surface and only the transmitted light can form images, thereby solving the problem of glare caused by ordinary glass. The glass can also be used to prepare glass lenses, to avoid the reflected light of the glass lenses to form images, thereby improving the imaging quality of glass lenses.

The above-mentioned embodiments merely represent several embodiments of the present disclosure, and the description thereof is more specific and detailed, but it should not be construed as limiting the scope of the present disclosure. It should be noted that, several modifications and improvements may be made for those of ordinary skill in the art without departing from the concept of the present disclosure, and these are all within the protection scope of the present disclosure. Therefore, the protection scope of the patent of this disclosure shall be subject to the appended claims.

What is claimed is:

1. A transmission structure, comprising: a plurality of first transmission units; and a plurality of second transmission units, wherein when an electromagnetic wave is incident on the first transmission unit and on the second transmission unit, a phase of an electromagnetic wave transmitted by the second transmission unit is equal or similar to a phase of an electromagnetic wave transmitted by the first transmission unit, and a phase of the electromagnetic wave reflected by the second transmission unit is different from a phase of the electromagnetic wave reflected by the first transmission unit; wherein the plurality of first transmission units and the plurality of second transmission units are arranged randomly on a surface; and wherein the phase $\varphi_{t2}$ of the electromagnetic wave transmitted by the second transmission unit and the phase $\varphi_{t1}$ of the electromagnetic wave transmitted by the first transmission unit satisfy $0 \leq |\varphi_{t2} - \varphi_{t1}| \leq 0.5\pi$.

2. The transmission structure according to claim 1, wherein the phase $\varphi_{r2}$ of the electromagnetic wave reflected by the second transmission unit and the phase $\varphi_{r1}$ of the electromagnetic wave reflected by the first transmission unit satisfy $0.6\pi \leq |\varphi_{r2} - \varphi_{r1}| \leq 1.4\pi$.

3. The transmission structure according to claim 2, wherein a modulus $r_2$ of a reflection coefficient of the electromagnetic wave of the second transmission unit and a modulus $r_1$ of a reflection coefficient of the electromagnetic wave of the first transmission unit satisfy $0.25 \leq r_2/r_1 \leq 4$.

4. The transmission structure according to claim 1, wherein a value of an effective relative dielectric constant of the first transmission unit is equal to a value of an effective relative magnetic permeability of the second transmission unit, a value of an effective relative magnetic permeability of the first transmission unit is equal to a value of an effective relative dielectric constant of the second transmission unit.

5. The transmission structure according to claim 4, wherein the first transmission unit is configured as a metal rod array and a metal split ring array having a first arrangement structure, the second transmission unit is configured as a metal rod array and a metal split ring array having a second arrangement structure, and the first arrangement structure and the second arrangement structure are different from each other.

6. The transmission structure according to claim 4, wherein the first transmission unit and the second transmission unit have a metal rod array and a metal split ring array of a same arrangement structure, wherein a size of a metal rod in the first transmission unit is different from a size of a metal rod in the second transmission unit, and/or a size of a metal split ring in the first transmission unit is different from a size of a metal split ring in the second transmission unit.

7. The transmission structure according to claim 1, wherein,
the first transmission unit comprises a first portion and a second portion that are sequentially disposed in a normal direction of an incident surface of the transmission structure, wherein the first portion and the second portion have different effective relative dielectric constants and/or different effective relative magnetic permeabilities;
the second transmission unit comprises the second portion and the first portion that are sequentially arranged in the normal direction of the incident surface of the transmission structure, and
if shifting the first transmission unit without rotating the first transmission unit to make the first transmission unit be stacked with the second transmission unit along the normal direction of the incident surface of the transmission structure, the first transmission unit and the second transmission unit would be mirror symmetrical with respect to a plane parallel to the incident surface of the transmission structure.

8. The transmission structure according to claim 7, wherein the first portion and the second portion are respectively formed of different single materials.

9. The transmission structure according to claim 8, wherein the single material comprises a light-transmitting material.

10. The transmission structure according to claim 7, wherein the first portion and the second portion are formed of a same single material, wherein a shape of a side of the first portion away from the second portion is different from a shape of a side of the second portion away from the first portion.

11. The transmission structure according to claim 7, wherein the first portion and/or the second portion are/is formed by compounding at least two different materials.

12. The transmission structure according to claim 11, wherein the first portion and/or the second portion are/is formed by arranging at least two different materials in the normal direction of the incident surface of the transmission structure.

13. The transmission structure according to claim 12, wherein both the first portion and the second portion are configured as film structures.

14. The transmission structure according to claim 12, wherein both the first portion and the second portion are formed by light-transmitting materials.

15. The transmission structure according to claim 11, wherein the first portion comprises a first base body, the second portion comprises a second base body, and a first embedded block is disposed on a surface of or inside the first base body, and/or a second embedded block is disposed on a surface of or inside the second base body.

16. The transmission structure according to claim 15, wherein a material of the first base body and a material of the second base body are the same.

17. The transmission structure according to claim 16, wherein the material comprises a light-transmitting material.

18. The transmission structure according to claim 15, wherein the first embedded block comprises a metal embedded block or a dielectric embedded block, and the second embedded block comprises a metal embedded block or a dielectric embedded block.

19. A film, comprising the transmission structure according to claim 1.

20. A resin sheet, comprising the transmission structure according to claim 1.

21. A glass, comprising the transmission structure according to claim 1.

* * * * *